United States Patent
Barclay

(10) Patent No.: US 10,363,586 B2
(45) Date of Patent: Jul. 30, 2019

(54) LARGE-AREA SELECTIVE ABLATION METHODS

(71) Applicant: The Boeing Company, Chicago, IL (US)

(72) Inventor: Richard Charles Barclay, Ladson, SC (US)

(73) Assignee: The Boeing Company, Chicago, IL (US)

( * ) Notice: Subject to any disclaimer, the term of this patent is extended or adjusted under 35 U.S.C. 154(b) by 73 days.

(21) Appl. No.: 15/397,171

(22) Filed: Jan. 3, 2017

(65) Prior Publication Data

US 2018/0185891 A1     Jul. 5, 2018

(51) Int. Cl.
| | |
|---|---|
| *B08B 7/00* | (2006.01) |
| *B23K 26/16* | (2006.01) |
| *B64F 5/30* | (2017.01) |
| *B23K 26/06* | (2014.01) |
| *B23K 26/362* | (2014.01) |
| *B23K 101/00* | (2006.01) |

(52) U.S. Cl.
CPC ........ *B08B 7/0042* (2013.01); *B23K 26/0626* (2013.01); *B23K 26/362* (2013.01); *B64F 5/30* (2017.01); *B23K 2101/006* (2018.08)

(58) Field of Classification Search
None
See application file for complete search history.

(56) References Cited

U.S. PATENT DOCUMENTS

| | | | | |
|---|---|---|---|---|
| 2007/0000885 A1* | 1/2007 | Thomas | ................ | B08B 7/0042 |
| | | | | 219/121.68 |
| 2009/0007933 A1* | 1/2009 | Thomas | ................ | B08B 7/0042 |
| | | | | 134/1 |

FOREIGN PATENT DOCUMENTS

| | | | | |
|---|---|---|---|---|
| WO | WO-03103861 A2 * | 12/2003 | ............. | A61K 8/046 |
| WO | WO-2004060600 A2 * | 7/2004 | ........... | B23K 26/073 |

OTHER PUBLICATIONS

Frank L. Palmieri et al., "Laser ablation surface preparation for adhesive bonding of carbon fiber reinforced epoxy composites," 68, Int. J. Adhes. Adhes., 95-101 (2016).
EWI Presentation at MRO Americas 2015 Aviations Week, "Innovative De-Painting: The Laser Coating Removal Robot," Miami Beach Convention Center, Miami Beach, Florida, Apr. 15, 2015.

\* cited by examiner

*Primary Examiner* — Katelyn B Whatley
(74) *Attorney, Agent, or Firm* — Dascenzo Intellectual Property Law, P.C.

(57) ABSTRACT

A method of using a laser ablation system to clean an area of a surface with a laser beam, having a target fluence and a target irradiance. The area comprises scan regions, each having a scan width. The method comprises determining a traverse scan speed, a laser-beam average power, a laser pulse repetition rate, a laser pulse width, and a laser-beam spot area of the laser beam for each one of the scan regions to achieve the target fluence and the target irradiance. The scan width of at least one of the scan regions is different from the scan width of another one of the scan regions. The method also comprises sequentially scanning, across the scan width, each one of the scan regions of the area with the laser beam at the target fluence and the target irradiance.

19 Claims, 3 Drawing Sheets

LARGE-AREA SELECTIVE ABLATION METHODS

TECHNICAL FIELD

The present disclosure relates to large-area selective ablation systems and methods.

BACKGROUND

Laser ablation is a method to clean or refresh surfaces. Contaminants or surface layers are ablated (destroyed) by applying laser energy directly to the surface. The laser is tuned to ablate the contaminants or surface layers while leaving the underlying surface material intact. The effectiveness of laser ablation is substantially due to the laser energy absorbed at the surface. If too much energy is absorbed, the surface may be damaged (over ablated). If too little energy is absorbed, the contaminants or surface layers may not be sufficiently affected (under ablated).

In conventional laser ablation, the laser beam is scanned across the surface in a raster fashion. The laser beam is scanned quickly in one direction (the scan direction) and relatively slowly in another direction (the traverse direction). The laser beam generally is scanned so quickly in the scan direction that the laser appears, and may be treated, as a laser sheet. Generally, laser ablation is performed by scanning a rectangular area with the width and breadth corresponding to the scan and traverse directions. The laser sheet in the scan direction is swept in the traverse direction at a traverse scan speed to cover the area to be ablated.

The effectiveness of laser ablation is determined by the irradiance (surface density of laser power) and fluence (surface density of accumulated laser energy), among other factors such as laser wavelength, surface material, and material to be ablated. For conventional laser ablation, the laser power is constant during ablation and the irradiance and fluence are substantially constant because the ablation area is rectangular with a constant scan width. If the scan width is changed, the irradiance and/or the fluence is changed. For example, a different scan width leads to a different width of the laser sheet and a different irradiance for the laser sheet (because the same laser power is spread over a different scan width). Hence, conventional laser ablation suffers from being restricted to rectangular areas (with a constant scan width), over ablation (due to exposing more area than necessary or exposing an area for too long), and/or under ablation (due to exposing an area for too little time).

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to a laser ablation system. The laser ablation system comprises a laser, a scanning head, a laser-positioning apparatus, and a controller. The laser is configured to emit a laser beam. The scanning head is configured to deliver the laser beam, emitted by the laser, onto a surface. The laser-positioning apparatus is configured to adjust relative positions of the surface and the scanning head. The controller is programmed to determine operation parameters and to scan the surface. The controller is programmed to determine operation parameters such as a traverse scan speed, a laser-beam average power, a laser pulse repetition rate, a laser pulse width, and a laser-beam spot area for each one of scan regions of an area of the surface. The traverse scan speed, the laser-beam average power, the laser pulse repetition rate, the laser pulse width, and the laser-beam spot area, corresponding to any one of the scan regions, produce a target fluence and a target irradiance of the laser beam. The scan regions are arranged so that all of the area of the surface is scannable with the laser beam. Each one of the scan regions has a scan width. The scan width of at least one of the scan regions is different from the scan width of another one of the scan regions. The controller is programmed to scan the area of the surface with the laser beam at the target fluence and the target irradiance by scanning each one of the scan regions at the traverse scan speed, corresponding to that particular one of the scan regions, and across the scan width, corresponding to that particular one of the scan regions. The laser beam has the laser-beam average power, corresponding to that particular one of the scan regions, the laser pulse repetition rate, corresponding to that particular one of the scan regions, the laser pulse width, corresponding to that particular one of the scan regions, and the laser-beam spot area, corresponding to that particular one of the scan regions.

Another example of the subject matter according to the invention relates to a method of using a laser ablation system to clean an area of a surface with a laser beam, having a target fluence and a target irradiance. The area comprises scan regions, each having a scan width. The method of using the laser ablation system comprises determining a traverse scan speed, a laser-beam average power, a laser pulse repetition rate, a laser pulse width, and a laser-beam spot area of the laser beam for each one of the scan regions to achieve the target fluence and the target irradiance of the laser beam when scanning each one of the scan regions with the laser beam. The scan width of at least one of the scan regions is different from the scan width of another one of the scan regions. The method also comprises sequentially scanning, across the scan width, each one of the scan regions of the area with the laser beam at the target fluence and the target irradiance.

BRIEF DESCRIPTION OF THE DRAWINGS

Figure 1:
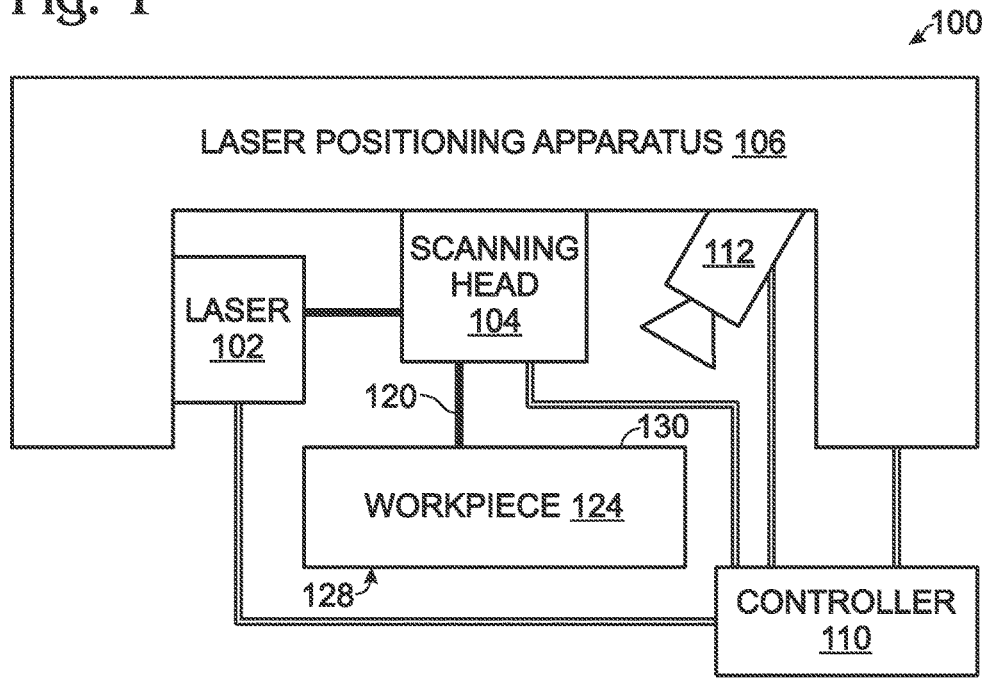
Figure 2:
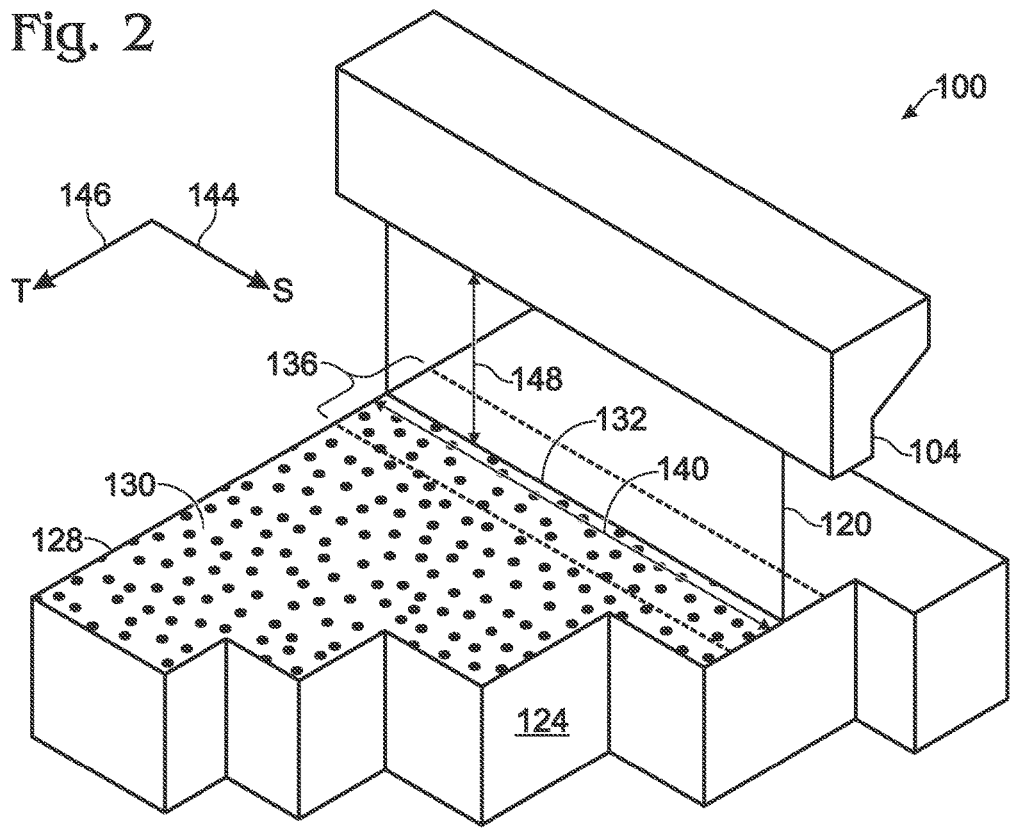
Figure 3:
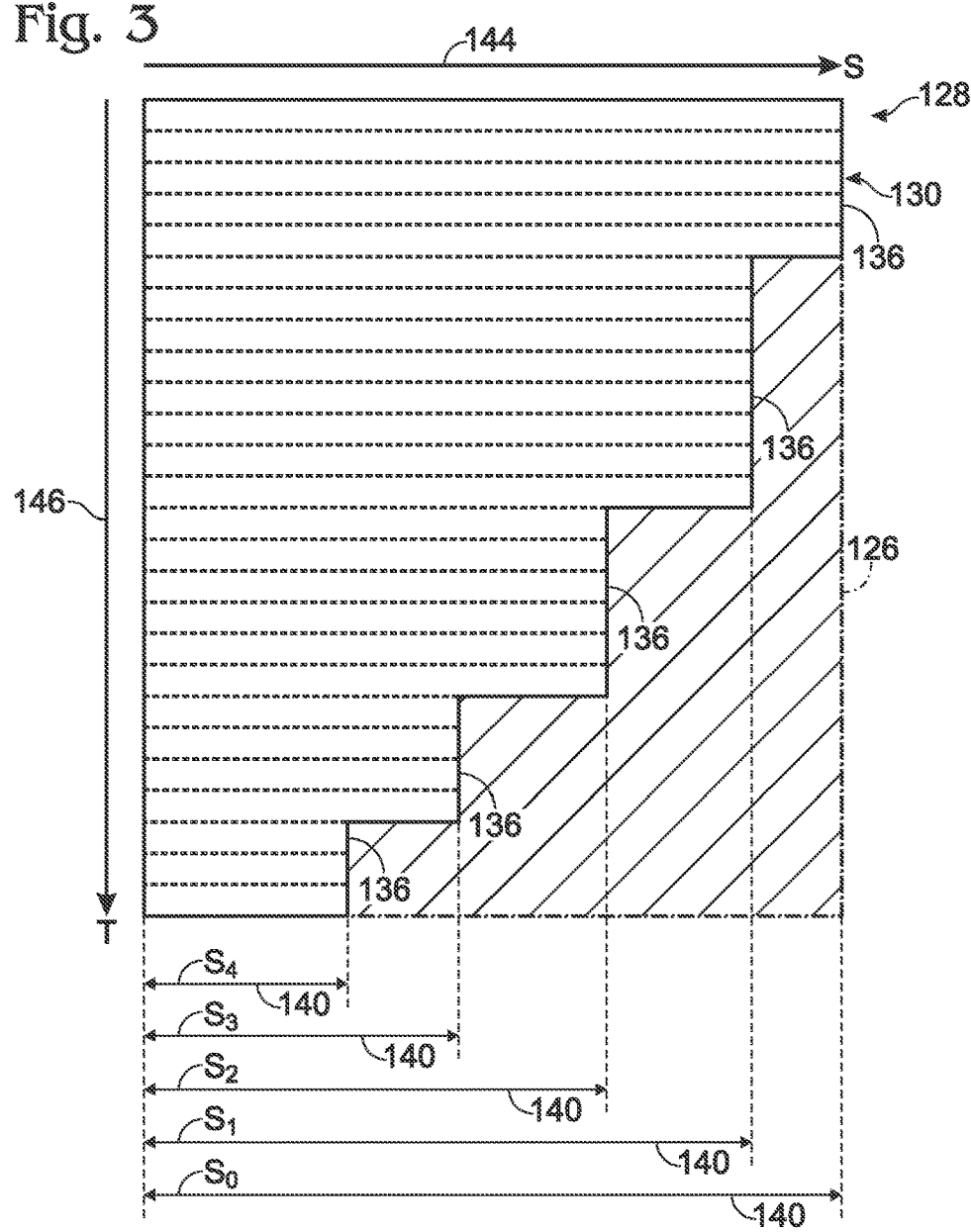
Figure 4:
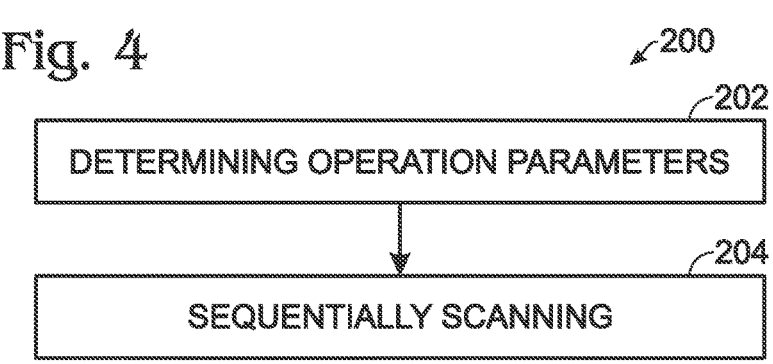
Figure 5:
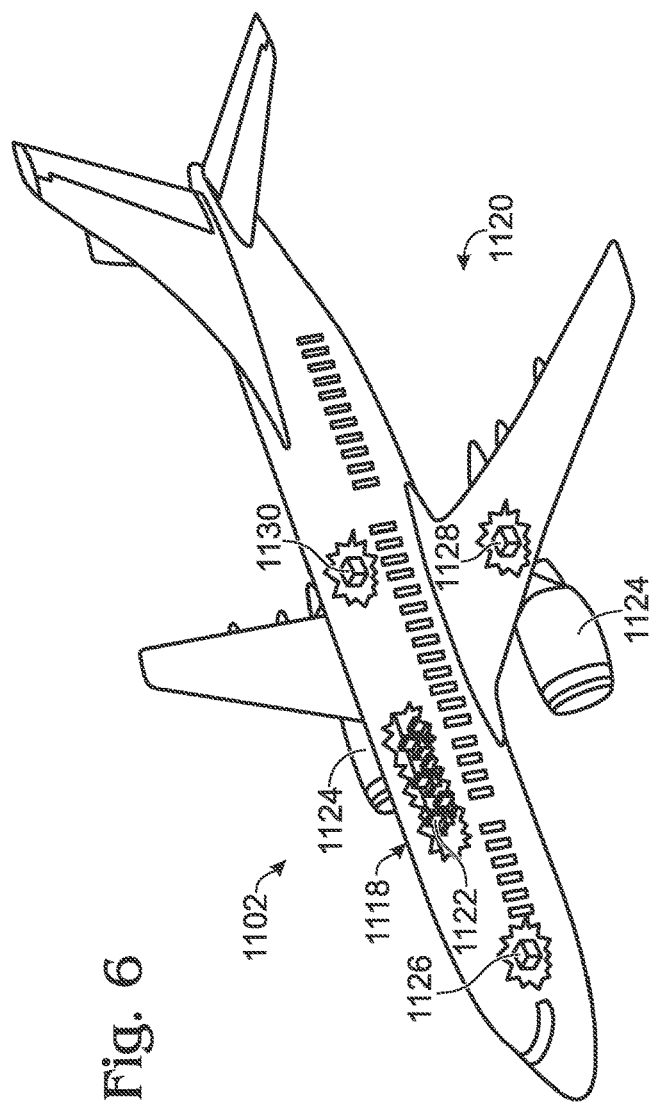

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a block diagram of a laser ablation system, according to one or more examples of the present disclosure;

FIG. 2 is a schematic, perspective view of the laser ablation system of FIG. 1, cleaning a surface of a workpiece, according to one or more examples of the present disclosure;

FIG. 3 is a schematic, top view of a surface of a workpiece indicating scan regions, according to one or more examples of the present disclosure;

FIG. 4 is a block diagram of a method of using the laser ablation system of FIG. 1 to clean an area of a surface, according to one or more examples of the present disclosure;

FIG. 5 is a block diagram of aircraft production and service methodology; and

Figure 6:
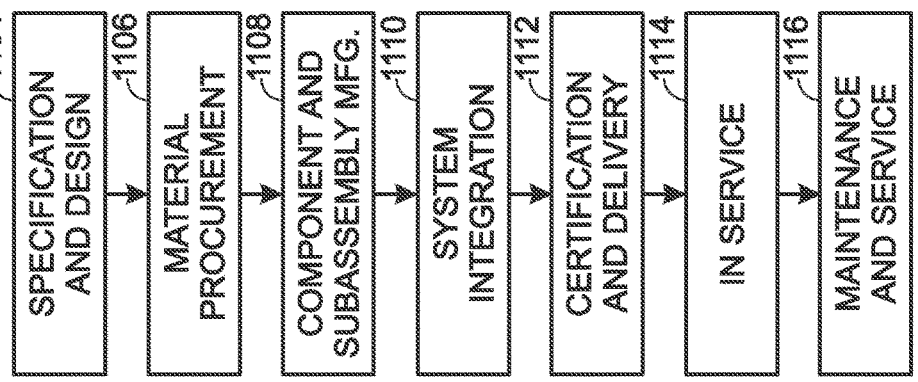

FIG. 6 is a schematic illustration of an aircraft.

DETAILED DESCRIPTION

In FIGS. 1-6, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1-6 may be combined in various ways without the need to include other features described in FIGS. 1-6, other drawing figures, and/or the accompanying disclosure, even though such combination or combinations are not explicitly illustrated herein. Similarly, additional features not limited to the examples presented, may be combined with some or all of the features shown and described herein.

In FIGS. 4-5, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 4-5 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIGS. 1-3 and particularly to, e.g., FIG. 1, laser ablation system 100 comprises laser 102, scanning head 104, laser-positioning apparatus 106, and controller 110. Laser 102 is configured to emit laser beam 120. Scanning head 104 is configured to deliver laser beam 120, emitted by laser 102, onto surface 128. Laser-positioning apparatus 106 is configured to adjust relative positions of surface 128 and scanning head 104. Controller 110 is programmed to determine operation parameters and to scan surface 128. Controller 110 is programmed to determine operation parameters, such as traverse scan speed, laser-beam average power, laser pulse repetition rate, laser pulse width, and laser-beam spot area for each one of scan regions 136 of area 130 of surface 128. The traverse scan speed, the laser-beam average power, the laser pulse repetition rate, the laser pulse width, and the laser-beam spot area, corresponding to any one of scan regions 136, produce a target fluence and a target irradiance of laser beam 120. Scan regions 136 are arranged so that all of area 130 of surface 128 is scannable with laser beam 120. Each one of scan regions 136 has scan width 140. Scan width 140 of at least one of scan regions 136 is different from scan width 140 of another one of scan regions 136. Controller 110 is programmed to scan area 130 of surface 128 with laser beam 120 at the target fluence and the target irradiance by scanning each one of scan regions 136 at the traverse scan speed, corresponding to that particular one of scan regions 136, and across scan width 140, corresponding to that particular one of scan regions 136. Laser beam 120 has the laser-beam average power, corresponding to that particular one of scan regions 136, the laser pulse repetition rate, corresponding to that particular one of scan regions 136, the laser pulse width, corresponding to that particular one of scan regions 136, and the laser-beam spot area, corresponding to that particular one of scan regions 136. The preceding subject matter of this paragraph characterizes example 1 of the present disclosure.

Laser ablation system 100 is configured to clean or refresh surface 128 by laser ablation with laser beam 120. In conventional laser ablation, the laser is operated with constant operation parameters (e.g., laser-beam power) and scanned over a rectangular region of the surface to be ablated. The laser is scanned in a raster fashion with constant speed and with each scan line having a constant scan width. If the area of interest (where ablation is desired) is non-rectangular or irregular, conventional laser ablation will apply too much power and/or energy in some regions, and/or not enough power and/or energy in other regions. For example, FIG. 3 illustrates area 130 of surface 128 that has a non-rectangular form (a stepped triangular shape). For a conventional laser ablation system to ablate area 130 of the example in FIG. 3, the laser may be scanned in rectangular region 126 that encompasses area 130. The area of rectangular region 126 outside of area 130 receives laser power in a conventional system and may be significantly damaged (or merely over ablated) by the unnecessary power. Additionally, the time to scan the area of rectangular region 126 outside of area 130 reduces the efficiency of ablation (adding unnecessary time to the total time to ablate area 130).

Further, if a conventional laser ablation system were to scan area 130 of FIG. 3 as a series of rectangular regions with differing scan widths 140, each different rectangular region would receive a different amount of laser energy and/or power because the laser is scanned in the same raster fashion at the same speed. More specifically, for a laser beam of constant power, the amount of energy deposited on a surface is proportional to the amount of time the laser beam impinges the surface (also referred to as the residence time at the surface). For conventional laser ablation systems and laser ablation system 100, the laser beam (e.g., laser beam 120) is raster scanned over the area of interest (e.g., area 130) by moving the laser beam in two distinct directions: scan width direction 144 and traverse direction 146. The laser (e.g., laser 102) is scanned relatively quickly in scan width direction 144 and relatively slowly in traverse direction 146. Typically, scanning in scan width direction 144 is so rapid that the laser beam may be considered a laser sheet with a width being the scan width (e.g., scan width 140). The power of the laser sheet is the same as the power of the laser beam but the irradiance (the surface density of the power, also referred to as the power density) of the laser sheet is reduced from that of the laser beam. The irradiance is inversely proportional to the width of the laser sheet (scan width). Hence, a smaller scan width produces a larger irradiance and a larger scan width produces a smaller irradiance.

The cleaning effectiveness (i.e., the effectiveness of ablation) of laser ablation is determined by the surface density of laser power and the surface density of laser energy at surface 128. The surface density of laser power (laser power divided by surface area receiving that power) is known as irradiance. The surface density of laser energy (laser energy divided by surface area receiving that energy) is known as fluence. Other factors, such as laser wavelength, surface material, and material to be ablated, also may affect the cleaning effectiveness.

Laser ablation system 100 is configured to adjust operation parameters for each of scan regions 136 such that each of scan regions 136 is scanned with the same target fluence and the same target irradiance. Scanning with the same fluence and irradiance provides the same cleaning effectiveness for each of scan regions 136. In conventional laser ablation, the fluence and irradiance are primarily determined by the scan width. If the scan width changes (while the scanning speed remains constant), the fluence and/or irradiance are changed because the residence time of the laser at the surface is adjusted.

Scan regions 136 are arranged within area 130 of surface 128. Surface 128 is a surface of workpiece 124 to be cleaned or refreshed by laser ablation by laser ablation system 100. Workpiece 124 is a workpiece of laser ablation system 100 and not necessarily a structure in the process of being formed. Examples of workpiece 124 include a mold, a form, a mandrel, a vehicle, a structural component, and elements thereof. Generally, workpiece 124 includes hard and/or resilient materials such as metal and/or ceramic. Surface 128 may be a substantially metal and/or ceramic surface. Workpiece 124 and/or surface 128 may include polymeric materials, glasses, and/or composite materials. For example, workpiece 124 may include carbon fiber-reinforced polymer.

Area 130 of surface 128 is a surface region of surface 128. Area 130 is a contiguous surface region of surface 128 but not necessarily the entirety of surface 128 or the entirety of one or more faces, facets, and/or planes of surface 128. Laser ablation system 100 is configured specifically to accommodate non-rectangular area 130. That is, scan regions 136, which are arranged within area 130, do not have scan width 140 that is uniform. At least one of scan regions 136 has scan width 140 that is different than at least one other of scan regions 136.

Scan regions 136 are each a distinct region of area 130 (scan regions 136 may partially overlap). Each of scan regions 136 may be a small section of area 130 and may be substantially the area swept by laser beam 120 in scan width direction 144. Laser beam 120 is directed by laser ablation system 100 (e.g., by laser-positioning apparatus 106) to move substantially continuously and sequentially among scan regions 136. Hence, completion of one of scan regions 136 is followed by the start of another of scan regions 136. Individual ones of scan regions 136 are distributed in traverse direction 146.

Laser 102 and laser beam 120 have several characteristics that may be adjusted to control irradiance and fluence in each of scan regions 136. Laser 102 has a temporally modulated output (i.e., the output is pulsed and/or modulated). Laser 102 may be a pulsed laser (e.g., laser 102 may be mode locked, cavity dumped, Q switched, etc.) and/or may include a gate, shutter, chopper, electro-optical cell, an acousto-optical cell, etc. to impose temporal structure in laser beam 120. Laser beam 120 has a laser-beam average power, a laser pulse repetition rate (fundamental frequency of the laser intensity), a laser pulse width, and a laser-beam spot area (the area of laser beam 120 as it impinges surface 128). The laser pulse width is the period of time in which the laser intensity is significant for each repetition period corresponding to the laser pulse repetition rate. For pulsed laser output, the laser pulse width, as used herein, is the full width of a pulse at half maximum intensity. Laser beam 120 is swept across scan regions 136, in scan width direction 144, at a raster scan speed (which may be different for different ones of scan regions 136). Laser beam 120 is swept between scan regions 136, in traverse direction 146, at a traverse scan speed (which may be different for different ones of scan regions 136). Each one of the characteristics (traverse scan speed, raster scan speed, laser-beam average power, laser pulse repetition rate, laser pulse width and laser-beam spot area) may be controlled or adjustable by laser ablation system 100 independently for each of scan regions 136. Some, but not all, of the characteristics may be the same for each of scan regions 136. That is, at least one of the characteristics is different for at least one of scan regions 136.

For laser ablation system 100, irradiance is a function of the laser-beam average power and the laser-beam spot area. As used herein, target irradiance specifically refers to peak irradiance, i.e., laser-beam peak power divided by the surface covered by laser beam 120. Generally, laser-beam peak power is a function of the laser-beam average power. Target irradiance may be calculated according to:

$$I = \frac{P}{P_r \cdot P_w \cdot A} \quad \text{(Eq. 1)}$$

where I is target irradiance (peak irradiance), P is laser-beam average power, $P_r$ is laser pulse repetition rate, $P_w$ is laser pulse width and A is laser-beam spot area. The target irradiance may be increased by increasing the laser-beam average power, decreasing the laser pulse repetition rate, decreasing the laser pulse width, and/or decreasing the laser-beam spot area. If the laser-beam average power is decreased, the target irradiance may be maintained by compensating decreases (proportional) in the laser pulse repetition rate, the laser pulse width, and/or the laser-beam spot area.

For laser ablation system 100, fluence is a function of the laser-beam average power, scan width 140, and the traverse scan speed. As used herein, target fluence specifically refers to fluence of laser beam 120 as it is scanned across area 130. Target fluence may be calculated according to:

$$F = \frac{P}{S_w \cdot T_s} \quad \text{(Eq. 2)}$$

where F is target fluence, P is laser-beam average power, $S_w$ is scan width 140, and $T_s$ is traverse scan speed. The target fluence may be decreased by decreasing the laser-beam average power, increasing scan width 140, and/or increasing the traverse scan speed. If scan width 140 is decreased, the target fluence may be maintained by a compensating increase (inverse proportional) in the traverse scan speed.

Raster scan speed, scan width 140, and traverse scan speed are implemented by scanning head 104 and laser-positioning apparatus 106. Scanning head 104 is configured to deliver laser beam 120 to surface 128 in area 130 (i.e., in scan regions 136). Scanning head 104 is configured to scan laser beam 120 a distance of scan width 140, for each of scan regions 136, in scan width direction 144 along scan line 132 at a rate of the raster scan speed. Scan line 132 is not necessarily a straight line and may be an arc, a curve, and/or a segmented line. Generally, the raster scan speed is much faster than the traverse scan speed such that laser beam 120, as it is scanned at raster scan speed, may be treated as a laser sheet. For example, the raster scan speed may be greater than 1,000 times the traverse scan speed. Scanning head 104 is configured to optically scan laser beam 120 because optically scanning laser beam 120 is generally much faster than mechanically scanning laser beam 120. Scanning head 104 includes a laser scanning apparatus for high speed scanning such as a mirror galvanometer and/or a polygonal mirror.

Laser-positioning apparatus 106 is configured to scan laser beam 120 in traverse direction 146 across surface 128 by adjusting the relative position of surface 128 and scanning head 104 (which delivers laser beam 120 to surface 128). Laser-positioning apparatus 106 adjusts the relative position according to the desired traverse scan speed for each of scan regions 136. Laser-positioning apparatus 106 may move scanning head 104 and/or workpiece 124 to achieve the relative motion of laser beam 120 with respect to surface 128. Laser-positioning apparatus 106 may include a gantry, stage, rail, positioner, etc. to move scanning head 104 and/or workpiece 124. Laser-positioning apparatus 106 may be configured to support and/or move other components of laser ablation system 100 (e.g., laser 102 and/or controller 110).

Motion in scan width direction 144 (due to scanning head 104) may be independent of motion in traverse direction 146 (due to laser-positioning apparatus 106). For example, raster scan speed and traverse scan speed may be varied independently. As another example, raster scan speed and traverse scan speed may be independent of the location of laser beam 120 relative to surface 128.

The following subject matter of this paragraph characterizes example 2 of the present disclosure, wherein example 2 also includes the subject matter according to example 1, above. Referring generally to FIGS. 1-3 and particularly to, e.g., FIG. 1, laser-positioning apparatus 106 comprises at least one of a gantry or a robotic positioner.

Laser-positioning apparatus 106 is configured for automatic operation and may be configured for versatile positioning. A gantry permits relatively arbitrary positioning of scanning head 104 relative to an open support space. A gantry permits positioning over a large distance and may accommodate large and/or complex workpiece geometries. For example, workpiece 124 may be an aircraft wing or a mold to form a fuselage section. A robotic positioner (also referred to as a robotic arm) permits relatively arbitrary positioning of scanning head 104 relative to an open support space. A robotic positioner permits positioning over a large volume and may accommodate large and/or complex workpiece geometries.

The following subject matter of this paragraph characterizes example 3 of the present disclosure, wherein example 3 also includes the subject matter according to any one of examples 1 to 2, above. Referring generally to FIGS. 1-3 and particularly to, e.g., FIG. 1, scanning head 104 comprises at least one of a polygonal mirror or a mirror galvanometer.

Scanning head 104 is configured to scan laser beam 120 in scan width direction 144 at the raster scan speed. The raster scan speed generally is much faster than the traverse scan speed. A polygonal mirror and/or a mirror galvanometer may optically deflect laser beam 120 to scan laser beam 120 at a rapid raster scan speed. A polygonal mirror may be used to produce a consistent raster scan speed over relatively constant scan width 140. A mirror galvanometer may be used to independently address different locations along scan line 132 and to select different scan widths 140 for each of scan regions 136.

The following subject matter of this paragraph characterizes example 4 of the present disclosure, wherein example 4 also includes the subject matter according to any one of examples 1 to 3, above. Referring generally to FIGS. 1-3 and particularly to, e.g., FIG. 1, laser 102 is optically coupled to scanning head 104 via at least one of a fiber optic or a free-space optical path.

Laser 102 is configured to provide laser beam 120 to scanning head 104. A fiber optic or a free-space optical path may permit motion of scanning head 104 relative to laser 102. Additionally or alternatively, a fiber optic or a free-space optical path may permit laser 102 to be located remote from scanning head 104, laser-positioning apparatus 106, and/or workpiece 124. Laser 102 and/or workpiece 124 may be large objects. Laser 102 generally is a high powered laser and may use specialized electrical connections and/or cooling apparatuses. Remote location may facilitate access to workpiece 124, laser-positioning apparatus 106, scanning head 104, and/or laser 102. Remote location may facilitate utility access to laser 102 (e.g., cooling water and/or electrical connection).

The following subject matter of this paragraph characterizes example 5 of the present disclosure, wherein example 5 also includes the subject matter according to any one of examples 1 to 4, above. Referring generally to FIGS. 1-3 and particularly to, e.g., FIG. 1, laser 102 is mechanically coupled to laser-positioning apparatus 106.

Laser 102 may be mechanically coupled and/or supported to laser-positioning apparatus 106. Being coupled and/or supported may facilitate a compact design of laser ablation system 100. Additionally or alternatively, being coupled and/or supported may facilitate optical routing of laser beam 120 from laser 102 to scanning head 104 that may be positioned by laser-positioning apparatus 106.

The following subject matter of this paragraph characterizes example 6 of the present disclosure, wherein example 6 also includes the subject matter according to any one of examples 1 to 5, above. Referring generally to FIGS. 1-3 and particularly to, e.g., FIG. 1, laser 102 is at least one of a pulsed laser, a mode-locked laser, and a Q-switched laser.

Laser beam 120 has temporal structure that may be in the form of pulses. A pulsed laser, a mode-locked laser, and a Q-switched laser intrinsically emit a pulsed laser beam. Pulsed laser beams may have a much higher peak power than average power. For example, the peak power of a pulsed laser beam is inversely related to the duty cycle of the laser beam (the laser pulse width relative to the laser repetition period). A pulsed laser beam may have a duty cycle of less than 0.001 and, hence, may have a peak power greater than 1,000 times the laser-beam average power. High peak powers may lead to high target irradiances and, hence, high cleaning effectiveness and/or short laser ablation times.

The following subject matter of this paragraph characterizes example 7 of the present disclosure, wherein example 7 also includes the subject matter according to any one of examples 1 to 6, above. Referring generally to FIGS. 1-3 and particularly to, e.g., FIG. 1, the target fluence is, for each one of scan regions 136, the laser-beam average power divided by a product of the scan width and the traverse scan speed. The target irradiance is, for each one of scan regions 136, the laser-beam average power divided by a product of the laser pulse repetition rate, the laser pulse width, and the laser-beam spot area.

The cleaning effectiveness of laser ablation system 100 is determined by the target fluence and the target irradiance. For each of scan regions 136, the same target fluence and target irradiance may be used to provide the same cleaning effectiveness for each of scan regions 136.

The following subject matter of this paragraph characterizes example 8 of the present disclosure, wherein example 8 also includes the subject matter according to any one of examples 1 to 7, above. Referring generally to FIGS. 1-3 and particularly to, e.g., FIG. 1, laser beam 120 is configured to ablate area 130 of surface 128 when laser beam 120 is applied along a nominal scan width with the target fluence and the target irradiance. The target fluence is a nominal laser-beam average power divided by a product of the nominal scan width and a nominal traverse scan speed. The target irradiance is the nominal laser-beam average power divided by a product of a nominal laser pulse repetition rate, a nominal laser pulse width, and a nominal laser-beam spot area.

Selection of a nominal scan width, a target fluence, and a target irradiance may provide sufficient information to determine a nominal laser-beam average power, a nominal traverse scan speed, a nominal laser pulse repetition rate, a nominal laser pulse width, and/or a nominal laser-beam spot area. Alternatively, the nominal parameters may define the target fluence and target irradiance. Selection of nominal scan width, target fluence, and/or target irradiance may be useful to tune laser ablation system 100 to ablate different materials (the material to be removed) and/or to preserve different materials (of surface 128) as may be present on various workpieces 124.

The following subject matter of this paragraph characterizes example 9 of the present disclosure, wherein example 9 also includes the subject matter according to any one of examples 1 to 8, above. Referring generally to FIGS. 1-3 and particularly to, e.g., FIG. 1, controller 110 is configured to receive scan regions 136 of area 130 of surface 128.

Scan regions 136 may be determined by inspection or modelling of surface 128. Scan regions 136 may be determined by sectioning area 130 into a series of regions, each of which may be described by only one scan width 140 for the region (individual ones of scan regions 136). Scan regions 136 may be determined by other devices and/or a human operator and then provided to controller 110 to follow the pattern of scan regions 136 provided. Hence, controller 110 may be dedicated to scanning operations and may not need to determine scan regions 136.

The following subject matter of this paragraph characterizes example 10 of the present disclosure, wherein example 10 also includes the subject matter according to any one of examples 1 to 9, above. Referring generally to FIGS. 1-3 and particularly to, e.g., FIG. 1, controller 110 is programmed to determine scan regions 136 of area 130 of surface 128 based upon a virtual model of surface 128.

Scan regions 136 may be determined by identifying area 130 of surface 128 and sectioning area 130 into scan regions 136. A virtual model of surface 128 and/or workpiece 124 may facilitate precise determination of location of area 130 and/or scan regions 136. The virtual model may be a two-dimensional (2D) or three-dimensional (3D) model and may be an electronic description of surfaces, boundaries, and/or points that describe surface 128 and/or workpiece 124. For example, the virtual model may be a CAD (computer aided design) model, a boundary representation, and/or a surface tessellation.

The following subject matter of this paragraph characterizes example 11 of the present disclosure, wherein example 11 also includes the subject matter according to example 10, above. Referring generally to FIGS. 1-3 and particularly to, e.g., FIG. 1, controller 110 is programmed to determine scan width 140 of each one of scan regions 136 based upon the virtual model of surface 128.

Each one of scan regions 136 may have different scan width 140 (at least one scan width 140 is different). Scan width 140 of each one of scan regions 136 may be determined by the size of scan regions 136 and/or area 130 determined from the virtual model of surface 128. The virtual model of surface 128 and/or workpiece 124 may facilitate precise determination of scan width 140 for each one of scan regions 136.

The following subject matter of this paragraph characterizes example 12 of the present disclosure, wherein example 12 also includes the subject matter according to any one of examples 10 to 11, above. Referring generally to FIGS. 1-3 and particularly to, e.g., FIG. 2, the virtual model of surface 128 is a three-dimensional (3D) model.

The 3D model may facilitate determining positions and/or orientations of scanning head 104 relative to surface 128. For example, the 3D model may be used to establish and/or maintain scan spacing 148 between scanning head 104 and surface 128.

The following subject matter of this paragraph characterizes example 13 of the present disclosure, wherein example 13 also includes the subject matter according to any one of examples 10 to 12, above. Referring generally to FIGS. 1-3 and particularly to, e.g., FIG. 1, the virtual model of surface 128 is based upon an image of surface 128.

The image of surface 128 may provide information on the shape and/or structure of surface 128 as actually present on surface 128. Virtual models based on design data may not reflect the present shape and/or structure of surface 128 after manufacture or use.

The following subject matter of this paragraph characterizes example 14 of the present disclosure, wherein example 14 also includes the subject matter according to example 13, above. Referring generally to FIGS. 1-3 and particularly to, e.g., FIG. 1, laser ablation system 100 further comprises machine vision system 112, configured to image surface 128. The image of surface 128 is acquired by machine vision system 112.

Machine vision system 112 may automatically collect images of surface 128 and/or provide images of surface 128 as it is situated with respect to laser ablation system 100. Machine vision system 112 may be used to acquire images for alignment of workpiece 124 and/or surface 128. Machine vision system 112 may be controlled by controller 110. Integrating machine vision system 112 within laser ablation system 100 may facilitate alignment of surface 128 and/or acquisition of the image to create the virtual model of surface 128.

The following subject matter of this paragraph characterizes example 15 of the present disclosure, wherein example 15 also includes the subject matter according to any one of examples 1 to 14, above. Referring generally to FIGS. 1-3 and particularly to, e.g., FIG. 1, controller 110 is programmed to identify a first one of scan regions 136 on surface 128 to be scanned by laser beam 120.

Laser ablation of surface 128 begins at one of scan regions 136 and continues with each of the other scan regions 136. The first one of scan regions 136 may be selected based upon proximity to an edge of area 130 and/or proximity to other scan regions 136. Ordering of scan regions 136 permits efficient laser ablation of area 130 of surface 128. For example, arranging first one of scan regions 136 and subsequent scan regions 136 such that completion of the first one of scan regions 136 (and subsequent scan regions 136) is at or near the next one of scan regions 136 permits laser ablation system 100 to scan area 130 with little time (or no time) devoted to moving between scan regions 136

The following subject matter of this paragraph characterizes example 16 of the present disclosure, wherein example 16 also includes the subject matter according to example 15, above. Referring generally to FIGS. 1-3 and particularly to, e.g., FIG. 1, laser ablation system 100 further comprises machine vision system 112. Controller 110 is further programmed to cause machine vision system 112 to acquire an image of surface 128 and to identify a location and an orientation of surface 128 in a coordinate system of laser ablation system 100 based at least in part upon the image of surface 128, acquired by machine vision system 112.

Machine vision system 112 may automatically collect images of surface 128 and/or provide images of surface 128 as it is situated with respect to laser ablation system 100. Machine vision system 112 may be used to acquire images for alignment of workpiece 124 and/or surface 128. Machine vision system 112 may be positioned in a known location and/or orientation with respect to other components of laser ablation system 100. Additionally or alternatively, machine vision system 112 may be configured to image surface 128 with reference fiducials or other markers in the image frame. The known location, known orientation, reference fiducials, and/or other markers provide a reference to establish and/or relate to the coordinate system of laser ablation system 100. Integrating machine vision system 112 within laser ablation system 100 may facilitate alignment of surface 128.

The following subject matter of this paragraph characterizes example 17 of the present disclosure, wherein example 17 also includes the subject matter according to any one of examples 15 to 16, above. Referring generally to FIGS. 1-3 and particularly to, e.g., FIG. 1, controller 110 is further programmed to identify the first one of scan regions 136 on surface 128 to be scanned by laser beam 120 based upon a virtual model of surface 128.

The first one of scan regions 136 may be determined by identifying area 130 of surface 128 and selecting the first one of scan regions 136 based upon proximity to an edge of area 130 and/or proximity to other scan regions 136. A virtual model of surface 128 and/or workpiece 124 may facilitate precise determination of location of area 130 and/or scan regions 136 (including the first one of scan regions 136).

The following subject matter of this paragraph characterizes example 18 of the present disclosure, wherein example 18 also includes the subject matter according to example 17, above. Referring generally to FIGS. 1-3 and particularly to, e.g., FIG. 2, the virtual model of surface 128 is a three-dimensional (3D) model.

The 3D model may facilitate determining positions and/or orientations of scanning head 104 relative to surface 128. For example, the 3D model may be used to establish and/or maintain scan spacing 148 between scanning head 104 and surface 128.

The following subject matter of this paragraph characterizes example 19 of the present disclosure, wherein example 19 also includes the subject matter according to any one of examples 1 to 18, above. Referring generally to FIGS. 1-3 and particularly to, e.g., FIG. 3, controller 110 is programmed to determine the traverse scan speed, the laser-beam average power, the laser pulse repetition rate, the laser pulse width, and the laser-beam spot area by equating the traverse scan speed to a maximum traverse scan speed and determining the laser pulse repetition rate in proportion to scan width 140 for each one of scan regions 136 when scan width 140 is less than a first critical scan width and greater than or equal to a second critical scan width. The first critical scan width is greater than the second critical scan width.

Laser ablation system 100 may have a maximum traverse scan speed. For example, traverse scan speed may be limited by reliable operation of mechanical components (i.e., components of laser-positioning apparatus 106) translating scanning head 104 and/or workpiece 124. For scan regions 136 in which scan width 140 is less than the first critical scan width (e.g., $S_1$ in FIG. 3), target fluence may be achieved by selecting a traverse scan speed greater than the maximum traverse scan speed. Smaller scan width 140 requires larger traverse scan speed to produce the same target fluence. If scan width 140 is small enough (i.e., less than the first critical scan width) to imply a traverse scan speed greater than the maximum traverse scan speed, traverse scan speed may be set to the maximum traverse scan speed and the laser-beam average power reduced to achieve the target fluence based on the maximum traverse scan speed and scan width 140 that is less than the first critical scan width. The laser-beam average power may be reduced in proportion to scan width 140 (according to Eq. 2) to achieve the target fluence. Laser-beam average power may be reduced in proportion to laser pulse repetition rate while maintaining the target irradiance (according to Eq. 1). Hence, to achieve both the target fluence and the target irradiance, the laser pulse repetition rate may be reduced in proportion to scan width 140 while the traverse scan speed is at the maximum traverse scan speed. Laser ablation system 100 may have a second critical scan width (e.g., $S_2$ in FIG. 3) below which this algorithm is not practical, desired, or reliable.

The following subject matter of this paragraph characterizes example 20 of the present disclosure, wherein example 20 also includes the subject matter according to any one of examples 1 to 19, above. Referring generally to FIGS. 1-3 and particularly to, e.g., FIG. 3, controller 110 is programmed to determine the traverse scan speed, the laser-beam average power, the laser pulse repetition rate, the laser pulse width, and the laser-beam spot area by equating the traverse scan speed to a maximum traverse scan speed, equating the laser pulse repetition rate to a minimum laser pulse repetition rate, and determining the laser pulse width in proportion to scan width 140 for each one of scan regions 136 when scan width 140 is less than a second critical scan width and greater than or equal to a third critical scan width. The second critical scan width is greater than the third critical scan width.

Laser ablation system 100 may have a maximum traverse scan speed and a minimum laser pulse repetition rate. The maximum traverse scan speed may be as described with respect to example 19. The minimum laser pulse repetition rate may be due to limits of laser 102 operation. For scan regions 136 in which scan width 140 is less than the second critical scan width (e.g., $S_2$ in FIG. 3), target fluence may be achieved by selecting a traverse scan speed greater than the maximum traverse scan speed and/or by selecting a traverse scan speed at the maximum traverse scan speed and selecting a laser pulse repetition rate less than the minimum laser pulse repetition rate. Smaller scan width 140 requires larger traverse scan speed to produce the same target fluence and smaller laser pulse repetition to achieve the same target fluence and target irradiance. If scan width 140 is small enough (i.e., less than the second critical scan width) to imply a traverse scan speed at the maximum traverse scan speed and a laser pulse repetition rate less than the minimum laser pulse repetition rate, traverse scan speed may be set to the maximum traverse scan speed, laser pulse repetition rate may be set to the minimum laser pulse repetition rate, and the laser-beam average power reduced to achieve the target fluence based on the maximum traverse scan speed and scan width 140 that is less than the second critical scan width. The laser-beam average power may be reduced in proportion to scan width 140 (according to Eq. 2) to achieve the target fluence. Laser-beam average power may be reduced in proportion to laser pulse width while maintaining the target irradiance (according to Eq. 1). Hence, to achieve both the target fluence and the target irradiance, the laser pulse width may be reduced in proportion to scan width 140 while the traverse scan speed is at the maximum traverse scan speed and the laser pulse repetition rate is at the minimum laser pulse repetition rate. Laser ablation system 100 may have a third critical scan width (e.g., $S_3$ in FIG. 3) below which this algorithm is not practical, desired, or reliable.

The following subject matter of this paragraph characterizes example 21 of the present disclosure, wherein example 21 also includes the subject matter according to any one of examples 1 to 20, above. Referring generally to FIGS. 1-3 and particularly to, e.g., FIG. 3, controller 110 is programmed to determine the traverse scan speed, the laser-beam average power, the laser pulse repetition rate, the laser pulse width, and the laser-beam spot area by equating the traverse scan speed to a maximum traverse scan speed, equating the laser pulse repetition rate to a minimum laser pulse repetition rate, equating the laser pulse width to a minimum laser pulse width, and determining the laser-beam spot area in proportion to scan width 140 for each one of scan regions 136 when scan width 140 is less than a third critical scan width.

Laser ablation system 100 may have a maximum traverse scan speed, a minimum laser pulse repetition rate, and a minimum laser pulse width. The maximum traverse scan speed and minimum laser pulse repetition rate may be as described with respect to examples 19 and 20. The minimum laser pulse width may be due to limits of laser 102 operation. For scan regions 136 in which scan width 140 is less than the third critical scan width (e.g., $S_3$ in FIG. 3), target fluence may be achieved by selecting a traverse scan speed greater than the maximum traverse scan speed, by selecting a traverse scan speed at the maximum traverse scan speed and selecting a laser pulse repetition rate less than the minimum laser pulse repetition rate, and/or by selecting a traverse scan speed at the maximum traverse scan speed, selecting a laser pulse repetition rate at the minimum laser pulse repetition rate, and selecting a laser pulse width less than the minimum laser pulse width. Smaller scan width 140 requires larger traverse scan speed to produce the same target fluence, smaller laser pulse repetition to achieve the same target fluence and target irradiance, and smaller laser pulse width to achieve the same target fluence and target irradiance. If scan width 140 is small enough (i.e., less than the third critical scan width) to imply a traverse scan speed at the maximum traverse scan speed, a laser pulse repetition rate at the minimum laser pulse repetition rate, and a laser pulse width less than the minimum laser pulse width, traverse scan speed may be set to the maximum traverse scan speed, laser pulse repetition rate may be set to the minimum laser pulse repetition rate, laser pulse width may be set to the minimum laser pulse width, and the laser-beam average power reduced to achieve the target fluence based on the maximum traverse scan speed and scan width 140 that is less than the third critical scan width. The laser-beam average power may be reduced in proportion to scan width 140 (according to Eq. 2) to achieve the target fluence. Laser-beam average power may be reduced in proportion to laser-beam spot area while maintaining the target irradiance (according to Eq. 1). Hence, to achieve both the target fluence and the target irradiance, the laser-beam spot area may be reduced in proportion to scan width 140 while the traverse scan speed is at the maximum traverse scan speed, the laser pulse repetition rate is at the minimum laser pulse repetition rate, and the laser pulse width is at the minimum laser pulse width. Laser ablation system 100 may have a fourth critical scan width (e.g., $S_4$ in FIG. 3) below which this algorithm is not practical, desired, or reliable.

The following subject matter of this paragraph characterizes example 22 of the present disclosure, wherein example 22 also includes the subject matter according to any one of examples 1 to 21, above. Referring generally to FIGS. 1-3 and particularly to, e.g., FIG. 1, scan regions 136 are contiguous so that area 130 is continuous.

Scan regions 136 are contiguous with each other, i.e., neighboring scan regions 136 touch, partially overlap, and/or connect with each other. With contiguous scan regions 136, laser beam 120 may be scanned from one of scan regions 136 to the next of scan regions 136 in a continuous motion, without needing to translate surface 128 relative to scanning head 104 between scan regions 136. Hence, scanning contiguous scan regions 136 does not need to incur delay between scan regions 136 and consequent inefficiency of ablation of area 130. Contiguous scan regions 136 provide for area 130 that is continuous and that may be characterized by having a single boundary to encompass all of scan regions 136. Area 130 that is continuous may have no internal voids or vacancies (regions not included in one of scan regions 136).

The following subject matter of this paragraph characterizes example 23 of the present disclosure, wherein example 23 also includes the subject matter according to any one of examples 1 to 22, above. Referring generally to FIGS. 1-3 and particularly to, e.g., FIG. 1, area 130 of surface 128 comprises scan regions 136.

Area 130 may comprise scan regions 136, may consist essentially of scan regions 136, and may comprise only scan regions 136. Scan regions 136 may be derived by sectioning area 130 such that each of scan regions 136 is a portion of area 130.

The following subject matter of this paragraph characterizes example 24 of the present disclosure, wherein example 24 also includes the subject matter according to any one of examples 1 to 23, above. Referring generally to FIGS. 1-3 and particularly to, e.g., FIG. 2, controller 110 is programmed to cause scanning head 104 to move laser beam 120 across area 130 of surface 128 with scan spacing 148 separating scanning head 104 from area 130 of surface 128.

Scan spacing 148 between scanning head 104 and area 130 of surface 128 may provide clearance and/or avoid contact between scanning head 104 and surface 128. Scan spacing 148 may be at focal point of laser beam 120 (if laser beam 120 has a focal point outside of scanning head 104) and/or may function to establish the laser-beam spot area as laser beam 120 is scanned across area 130.

The following subject matter of this paragraph characterizes example 25 of the present disclosure, wherein example 25 also includes the subject matter according to example 24, above. Referring generally to FIGS. 1-3 and particularly to, e.g., FIG. 2, scan spacing 148, separating scanning head 104 from area 130 of surface 128, is substantially constant within each one of scan regions 136.

Substantially constant (or uniform) scan spacing 148 within one of scan regions 136 may establish a substantially constant (or uniform) laser-beam spot area in that one of scan regions 136. For each of scan regions 136, scan spacing 148 may be substantially constant (or uniform), though different ones of scan regions 136 may be scanned with different scan spacing 148 values. Scan spacing 148 (and hence possibly the laser-beam spot area) may be optimized for each one of scan regions 136 independently.

The following subject matter of this paragraph characterizes example 26 of the present disclosure, wherein example 26 also includes the subject matter according to any one of examples 24 to 25, above. Referring generally to FIGS. 1-3 and particularly to, e.g., FIG. 2, scan spacing 148, separating scanning head 104 from area 130 of surface 128, is substantially constant for all scan regions 136.

Scan spacing 148 may not vary between scan regions 136, which may facilitate transitions between scan regions 136 without translation of surface 128 relative to scanning head 104. Substantially constant (or uniform) scan spacing 148 for all scan regions 136 may not preclude adjustment of laser-beam spot area. The laser-beam spot area may be varied as necessary or desired by adjusting the focal distance of laser beam 120 from scanning head 104.

The following subject matter of this paragraph characterizes example 27 of the present disclosure, wherein example 27 also includes the subject matter according to any one of examples 1 to 26, above. Referring generally to FIGS. 1-3 and particularly to, e.g., FIG. 1, controller 110 is programmed to cause scanning head 104 to move laser beam 120 across area 130 of surface 128 with an angle of incidence substantially normal to each one of scan regions 136.

Scanning each of scan regions 136 at a perpendicular (normal) angle of incidence may provide for effective ablation in scan regions 136. Laser beam 120 may have higher (or maximum) target irradiance when laser beam 120 is oriented normal to surface 128. If laser beam 120 impinges surface 128 at an angle significantly different from normal (perpendicular), the spot of laser beam 120 may distort and become larger (thus reducing target irradiance). As used herein, a normal angle of incidence is approximately perpendicular to surface 128 (at about 90°, e.g., within the range of 80°-90°).

Referring generally to FIGS. 1-3 and particularly to, e.g., FIG. 4, method 200 of using laser ablation system 100 to clean area 130 of surface 128 with laser beam 120 is disclosed. Laser beam 120 has a target fluence and a target irradiance. Area 130 comprises scan regions 136, each having scan width 140. Method 200 comprises (block 202) determining traverse scan speed, laser-beam average power, laser pulse repetition rate, laser pulse width, and laser-beam spot area of laser beam 120 for each one of scan regions 136 to achieve the target fluence and the target irradiance of laser beam 120 when scanning each one of scan regions 136 with laser beam 120. Scan width 140 of at least one of scan regions 136 is different from scan width 140 of another one of scan regions 136. Method 200 also comprises (block 204) scanning, across scan width 140, each one of scan regions 136 of area 130 with laser beam 120 at the target fluence and the target irradiance. The preceding subject matter of this paragraph characterizes example 28 of the present disclosure.

Method 200 applies a uniform target fluence and a uniform target irradiance to all of scan regions 136 so that area 130 is uniformly ablated. Cleaning effectiveness is determined by target fluence and target irradiance. By selecting the target fluence and the target irradiance appropriately, area 130 may be efficiently ablated without significant over ablation, significant under ablation, or scanning of regions outside of area 130. Relative to conventional laser ablation, changes in scan width 140 between scan regions 136 are compensated to maintain the target fluence and the target irradiance for all of scan regions 136.

Operation parameters (e.g., traverse scan speed, laser-beam average power, laser pulse repetition rate, laser pulse width, and laser-beam spot area) are determined independently for each one of scan regions 136 based on scan width 140 for that one of scan regions 136, the target fluence, and the target irradiance. Operation parameters may be determined based on target fluence and target irradiance as described in Eq. 1 and 2. At least one of the operation parameters is changed for at least one of scan regions 136 because at least one scan width 140 is different among scan regions 136.

Scan regions 136 are arranged within area 130 of surface 128 and are ordered. Sequentially scanning (block 204) comprises scanning each one of scan regions 136, one after the other, in sequential order. Scanning sequentially may reduce time moving scanning head 104, laser beam 120, and/or workpiece 124 between scan regions 136 and, hence, may increase efficiency relative to scanning out of order.

The following subject matter of this paragraph characterizes example 29 of the present disclosure, wherein example 29 also includes the subject matter according to example 28, above. Referring generally to FIGS. 1-3 and particularly to, e.g., FIG. 4, according to method 200, when scan width 140 of at least one of scan regions 136 is different from scan width 140 of another one of scan regions 136, at least one of the traverse scan speed, the laser-beam average power, the laser pulse repetition rate, the laser pulse width, or the laser-beam spot area of laser beam 120 for at least the one of scan regions 136 is different from at least one of the traverse scan speed, the laser-beam average power, the laser pulse repetition rate, the laser pulse width, or the laser-beam spot area of laser beam 120 for the other one of scan regions 136.

To maintain the target fluence and the target irradiance for all of scan regions 136, one or more changes in the traverse scan speed, the laser-beam average power, the laser pulse repetition rate, the laser pulse width and/or the laser-beam spot area may be used to compensate for changes in scan width 140 among scan regions 136. Compensating changes may be determined using Eq. 1 and 2.

The following subject matter of this paragraph characterizes example 30 of the present disclosure, wherein example 30 also includes the subject matter according to any one of examples 28 to 29, above. Referring generally to FIGS. 1-3 and particularly to, e.g., FIG. 4, according to method 200, laser beam 120 has an initial laser-beam average power. For at least one of scan regions 136, the traverse scan speed is the initial laser-beam average power divided by a product of scan width 140 of at least the one of scan regions 136 and the target fluence.

The traverse scan speed may be determined using Eq. 2, i.e., the traverse scan speed is the laser-beam average power divided by a product of scan width 140 and target fluence. If initial laser-beam average power and scan width 140 (for at least one of scan regions 136) is suitable to set traverse scan speed (e.g., the calculated traverse scan speed is within limits of operation), the traverse scan speed is the product of scan width 140 of at least one of scan regions 136 and the target fluence. Setting traverse scan speed according to Eq. 2 permits compensation of changes in scan width 140 without affecting laser output parameters.

The following subject matter of this paragraph characterizes example 31 of the present disclosure, wherein example 31 also includes the subject matter according to any one of examples 28 to 30, above. Referring generally to FIGS. 1-3 and particularly to, e.g., FIG. 4, according to method 200, laser beam 120 has an initial laser-beam average power. Scan regions 136 comprise an adapted scan region. Determining the traverse scan speed, the laser-beam average power, the laser pulse repetition rate, the laser pulse width, and the laser-beam spot area for each one of scan regions 136 comprises determining that a projected traverse scan speed for the adapted scan region is greater than a maximum traverse scan speed. The projected traverse scan speed for the adapted scan region is the initial laser-beam average power divided by a product of scan width 140 of the adapted scan region and the target fluence. Method 200 further comprises determining an adapted laser-beam average power that is a product of the target fluence, scan width 140 of the adapted scan region, and the maximum traverse scan speed.

Laser ablation system 100 may have a maximum traverse scan speed. For example, traverse scan speed may be limited by reliable operation of mechanical components (i.e., components of laser-positioning apparatus 106) translating scanning head 104 and/or workpiece 124. For scan regions 136 in which scan width 140 is less than a first critical scan width (e.g., $S_1$ in FIG. 3), target fluence may be achieved by selecting a projected traverse scan speed greater than the maximum traverse scan speed. Such scan regions 136 may be referred to as adapted scan regions because adaptation of operation parameters is required to achieve the target fluence and not exceed the maximum traverse scan speed. For adapted scan regions, the projected traverse scan speed may be set to the maximum traverse scan speed and the adapted laser-beam average power may be reduced from the initial laser-beam average power to achieve the target fluence based on the maximum traverse scan speed and scan width 140 of the adapted scan region. The adapted laser-beam average power may be set according to Eq. 2, i.e., the adapted laser-beam average power is the product of the target fluence, scan width 140 of the adapted scan region, and the maximum traverse scan speed.

The following subject matter of this paragraph characterizes example 32 of the present disclosure, wherein example 32 also includes the subject matter according to example 31, above. Referring generally to FIGS. 1-3 and particularly to, e.g., FIG. 4, according to method 200, the laser pulse repetition rate of the adapted scan region is the adapted laser-beam average power divided by a product of the target irradiance, the laser pulse width for the adapted scan region, and the laser-beam spot area for the adapted scan region. Scanning area 130 of surface 128 comprises scanning the adapted scan region at the maximum traverse scan speed across scan width 140 of the adapted scan region while laser beam 120 has the adapted laser-beam average power, the laser pulse repetition rate for the adapted scan region, the laser pulse width for the adapted scan region, and the laser-beam spot area for the adapted scan region.

Further adaptation of operation parameters (beyond that described in example 31) may be achieved by adjusting the laser pulse repetition rate of the adapted scan region according to Eq. 1. Specifically, the laser pulse repetition rate of the adapted scan region is the adapted laser-beam average power divided by a product of the target irradiance, the laser pulse width for the adapted scan region, and the laser-beam spot area for the adapted scan region. Further adapting in this manner permits maintaining the target irradiance while adapting the laser-beam average power to maintain the target fluence.

The following subject matter of this paragraph characterizes example 33 of the present disclosure, wherein example 33 also includes the subject matter according to example 31, above. Referring generally to FIGS. 1-3 and particularly to, e.g., FIG. 4, according to method 200, determining the traverse scan speed, the laser-beam average power, the laser pulse repetition rate, the laser pulse width, and the laser-beam spot area for each one of scan regions 136 comprises determining that a projected laser pulse repetition rate for the adapted scan region is less than a minimum laser pulse repetition rate. The projected laser pulse repetition rate for the adapted scan region is the adapted laser-beam average power divided by a product of the target irradiance, the laser pulse width for the adapted scan region, and the laser-beam spot area for the adapted scan region.

Laser ablation system 100 may have a minimum laser pulse repetition rate. The minimum laser pulse repetition rate may be due to limits of laser 102 operation. For scan regions 136 in which scan width 140 is less than a second critical scan width (e.g., $S_2$ in FIG. 3), target fluence and target irradiance may be achieved by selecting a projected traverse scan speed at the maximum traverse scan speed and by selecting a projected laser pulse repetition rate less than the minimum laser pulse repetition rate. For these adapted scan regions, the projected traverse scan speed may be set to the maximum traverse scan speed, the projected laser pulse repetition rate at the minimum laser pulse repetition rate, and the adapted laser-beam average power may be reduced from the initial laser-beam average power to achieve the target fluence and the target irradiance based on the maximum traverse scan speed, the minimum laser pulse repetition rate, and scan width 140 of the adapted scan region. The adapted laser-beam average power may be set according to the minimum laser pulse repetition rate and Eq. 1.

The following subject matter of this paragraph characterizes example 34 of the present disclosure, wherein example 34 also includes the subject matter according to example 33, above. Referring generally to FIGS. 1-3 and particularly to, e.g., FIG. 4, according to method 200, the laser pulse width for the adapted scan region is the adapted laser-beam average power divided by a product of the target irradiance, the minimum laser pulse repetition rate, and the laser-beam spot area for the adapted scan region. Scanning area 130 of surface 128 comprises scanning the adapted scan region at the maximum traverse scan speed across scan width 140 of the adapted scan region while laser beam 120 has the adapted laser-beam average power, the minimum laser pulse repetition rate, the laser pulse width for the adapted scan region, and the laser-beam spot area for the adapted scan region.

Further adaptation of operation parameters (beyond that described in example 33) may be achieved by adjusting the laser pulse width of the adapted scan region according to Eq. 1. Specifically, the laser pulse width of the adapted scan region is the adapted laser-beam average power divided by a product of the target irradiance, the minimum laser pulse repetition rate, and the laser-beam spot area for the adapted scan region. Further adapting in this manner permits maintaining the target irradiance while adapting the laser-beam average power to maintain the target fluence.

The following subject matter of this paragraph characterizes example 35 of the present disclosure, wherein example 35 also includes the subject matter according to example 33, above. Referring generally to FIGS. 1-3 and particularly to, e.g., FIG. 4, according to method 200, determining the traverse scan speed, the laser-beam average power, the laser pulse repetition rate, the laser pulse width, and the laser-beam spot area for each one of scan regions 136 comprises determining that a projected laser pulse width for the adapted scan region is less than a minimum laser pulse width. The projected laser pulse width for the adapted scan region is the adapted laser-beam average power divided by a product of the target irradiance, the minimum laser pulse repetition rate, and the laser-beam spot area for the adapted scan region. The laser-beam spot area for the adapted scan region is the adapted laser-beam average power divided by a product of the target irradiance, the minimum laser pulse repetition rate, and the minimum laser pulse width. Scanning area 130 of surface 128 comprises scanning the adapted scan region at the maximum traverse scan speed across scan width 140 of the adapted scan region while laser beam 120 has the adapted laser-beam average power, the minimum laser pulse repetition rate, the minimum laser pulse width, and the laser-beam spot area for the adapted scan region.

Laser ablation system 100 may have a minimum laser pulse width. The minimum laser pulse width may be due to limits of laser 102 operation. For scan regions 136 in which scan width 140 is less than a third critical scan width (e.g., $S_3$ in FIG. 3), target fluence and target irradiance may be achieved by selecting a projected traverse scan speed at the maximum traverse scan speed, by selecting a projected laser pulse repetition rate at the minimum laser pulse repetition rate, and by selecting a projected laser pulse width less than the minimum laser pulse width. For these adapted scan regions, the projected traverse scan speed may be set to the maximum traverse scan speed, the projected laser pulse repetition rate at the minimum laser pulse repetition rate, the projected laser pulse width at the minimum laser pulse width, and the adapted laser-beam average power may be reduced from the initial laser-beam average power to achieve the target fluence and the target irradiance based on the maximum traverse scan speed, the minimum laser pulse repetition rate, the minimum laser pulse width, and scan width 140 of the adapted scan region. The adapted laser-beam average power may be set according to the minimum laser pulse repetition rate, minimum laser pulse width, and Eq. 1.

The following subject matter of this paragraph characterizes example 36 of the present disclosure, wherein example 36 also includes the subject matter according to any one of examples 28 to 35, above. Referring generally to FIGS. 1-3 and particularly to, e.g., FIG. 4, method 200 further comprises receiving information descriptive of scan regions 136 of area 130 of surface 128.

Scan regions 136 may be determined by inspection or modelling of surface 128. Scan regions 136 may be determined by sectioning area 130 into a series of regions, each of which may be described by only one scan width 140 for the region (individual ones of scan regions 136). Scan regions 136 may be determined by other devices and/or a human operator and then received in method 200. The information descriptive of scan regions 136 may include the locations, orientations, boundaries, and/or order of scan regions 136. The information received may be used to scan laser beam 120 in scan regions 136 as described.

The following subject matter of this paragraph characterizes example 37 of the present disclosure, wherein example 37 also includes the subject matter according to any one of examples 28 to 36, above. Referring generally to FIGS. 1-3 and particularly to, e.g., FIG. 4, method 200 further comprises defining scan regions 136 of area 130 of surface 128 based upon a virtual model of surface 128.

Scan regions 136 may be defined by identifying area 130 of surface 128 and sectioning area 130 into scan regions 136. A virtual model of surface 128 and/or workpiece 124 may facilitate precise determination of location of area 130 and/or scan regions 136. The virtual model may be a 2D or 3D model and may be an electronic description of surfaces, boundaries, and/or points that describe surface 128 and/or workpiece 124. For example, the virtual model may be a CAD model, a boundary representation, and/or a surface tessellation.

The following subject matter of this paragraph characterizes example 38 of the present disclosure, wherein example 38 also includes the subject matter according to example 37, above. Referring generally to FIGS. 1-3 and particularly to, e.g., FIG. 4, method 200 further comprises determining scan width 140 of each one of scan regions 136 based upon the virtual model of surface 128.

Each one of scan regions 136 may have different scan width 140 (at least one scan width 140 is different). Scan width 140 of each one of scan regions 136 may be determined by the size of scan regions 136 and/or area 130 determined from the virtual model of surface 128. The virtual model of surface 128 and/or workpiece 124 may facilitate precise determination of scan width 140 for each one of scan regions 136.

The following subject matter of this paragraph characterizes example 39 of the present disclosure, wherein example 39 also includes the subject matter according to any one of examples 37 to 38, above. Referring generally to FIGS. 1-3 and particularly to, e.g., FIG. 4, according to method 200, the virtual model of surface 128 is a three-dimensional (3D) model.

The 3D model may facilitate determining positions and/or orientations of scanning head 104 relative to surface 128. For example, the 3D model may be used to establish and/or maintain scan spacing 148 between scanning head 104 and surface 128.

The following subject matter of this paragraph characterizes example 40 of the present disclosure, wherein example 40 also includes the subject matter according to any one of examples 37 to 39, above. Referring generally to FIGS. 1-3 and particularly to, e.g., FIG. 4, according to method 200, the virtual model of surface 128 is based upon an image of surface 128.

The image of surface 128 may provide information on the shape and/or structure of surface 128 as actually present on surface 128. Virtual models based on design data may not reflect the present shape and/or structure of surface 128 after manufacture or use.

The following subject matter of this paragraph characterizes example 41 of the present disclosure, wherein example 41 also includes the subject matter according to any one of examples 28 to 40, above. Referring generally to FIGS. 1-3 and particularly to, e.g., FIG. 4, method 200 further comprises identifying a first one of scan regions 136 on surface 128 to be scanned by laser beam 120.

Sequentially scanning (block 204) of surface 128 begins at one of scan regions 136 and continues with each of the other scan regions 136. The first one of scan regions 136 may be selected based upon proximity to an edge of area 130 and/or proximity to other scan regions 136. Ordering of scan regions 136 permits efficient laser ablation of area 130 of surface 128. For example, arranging first one of scan regions 136 and subsequent scan regions 136 such that completion of the first one of scan regions 136 (and subsequent scan regions 136) is at or near the next one of scan regions 136 permits laser ablation system 100 to scan area 130 with little time (or no time) devoted to moving between scan regions 136

The following subject matter of this paragraph characterizes example 42 of the present disclosure, wherein example 42 also includes the subject matter according to example 41, above. Referring generally to FIGS. 1-3 and particularly to, e.g., FIG. 4, according to method 200, identifying the first one of scan regions 136 on surface 128 to be scanned by laser beam 120 comprises locating and particularly orienting surface 128 in a coordinate system of scan regions 136.

Locating and particularly orienting surface 128 in the coordinate system of scan regions 136 may include locating and orienting workpiece 124 with mechanical or optical features to place the workpiece 124 as desired. Locating and orienting workpiece 124 may facilitate identifying the first one of scan regions 136 (e.g., selecting the one of scan regions 136 nearest the origin of the coordinate system and/or nearest the edge of surface 128).

The following subject matter of this paragraph characterizes example 43 of the present disclosure, wherein example 43 also includes the subject matter according to example 41, above. Referring generally to FIGS. 1-3 and particularly to, e.g., FIG. 4, according to method 200, identifying the first one of scan regions 136 on surface 128 to be scanned by laser beam 120 comprises probing surface 128 to identify a location and an orientation of surface 128 in a coordinate system of laser ablation system 100.

Probing surface 128 to identify a location and an orientation of surface 128 in a coordinate system of laser ablation system 100 may include contacting surface 128 or using optical tools (e.g., laser range finder) to identify the location and orientation of workpiece 124 and/or surface 128 as placed in laser ablation system 100.

The following subject matter of this paragraph characterizes example 44 of the present disclosure, wherein example 44 also includes the subject matter according to example 41, above. Referring generally to FIGS. 1-3 and particularly to, e.g., FIG. 4, according to method 200, identifying the first one of scan regions 136 on surface 128 to be scanned by laser beam 120 comprises imaging surface 128 to identify a location and an orientation of surface 128 in a coordinate system of laser ablation system 100.

Imaging surface 128 may include imaging from a known location and/or orientation with respect to the coordinate system of laser ablation system 100. Additionally or alternatively, imaging surface 128 may include acquiring images with reference fiducials or other markers in the image frame. The known location, known orientation, reference fiducials, and/or other markers provide a reference to establish and/or relate to the coordinate system of laser ablation system 100.

The following subject matter of this paragraph characterizes example 45 of the present disclosure, wherein example 45 also includes the subject matter according to any one of examples 41 to 44, above. Referring generally to FIGS. 1-3 and particularly to, e.g., FIG. 4, according to method 200, identifying the first one of scan regions 136 on surface 128 to be scanned by laser beam 120 is based upon a virtual model of surface 128.

The first one of scan regions 136 may be determined by identifying area 130 of surface 128 and selecting the first one of scan regions 136 based upon proximity to an edge of area 130 and/or proximity to other scan regions 136. A virtual model of surface 128 and/or workpiece 124 may facilitate precise determination of location of area 130 and/or scan regions 136 (including the first one of scan regions 136).

The following subject matter of this paragraph characterizes example 46 of the present disclosure, wherein example 46 also includes the subject matter according to example 45, above. Referring generally to FIGS. 1-3 and particularly to, e.g., FIG. 4, according to method 200, the virtual model of surface 128 is a three-dimensional (3D) model.

The 3D model may facilitate determining positions and/or orientations of scanning head 104 relative to surface 128. For example, the 3D model may be used to establish and/or maintain scan spacing 148 between scanning head 104 and surface 128.

The following subject matter of this paragraph characterizes example 47 of the present disclosure, wherein example 47 also includes the subject matter according to any one of examples 45 to 46, above. Referring generally to FIGS. 1-3 and particularly to, e.g., FIG. 4, according to method 200, the virtual model of surface 128 is based upon an image of surface 128.

The image of surface 128 may provide information on the shape and/or structure of surface 128 as actually present on surface 128. Virtual models based on design data may not reflect the present shape and/or structure of surface 128 after manufacture or use.

The following subject matter of this paragraph characterizes example 48 of the present disclosure, wherein example 48 also includes the subject matter according to any one of examples 28 to 47, above. Referring generally to FIGS. 1-3 and particularly to, e.g., FIG. 4, method 200 further comprises receiving information descriptive of the target fluence and the target irradiance.

The target fluence and the target irradiance may be determined according to Eq. 1 and 2, experiment, modelling, type of material at surface 128, and type and/or amount of material to be removed from surface 128. The information descriptive of the target fluence and the target irradiance may include the value of the target fluence, the value of the target irradiance, and/or operation parameters used to calculate the target fluence and the target irradiance using Eq. 1 and 2. The information received may be used to scan laser beam 120 in scan regions 136 with the target fluence and the target irradiance.

The following subject matter of this paragraph characterizes example 49 of the present disclosure, wherein example 49 also includes the subject matter according to any one of examples 28 to 48, above. Referring generally to FIGS. 1-3 and particularly to, e.g., FIG. 4, method 200 further comprises determining the target fluence and the target irradiance based upon a received ablation depth.

The received ablation depth may be used to determine the target fluence and the target irradiance based upon the type and/or amount of material to be ablated, the optical absorbance of the material to be ablated, and the laser wavelength. The relation between ablation depth and target fluence and/or target irradiance may be determined by modelling and/or experiment.

The following subject matter of this paragraph characterizes example 50 of the present disclosure, wherein example 50 also includes the subject matter according to any one of examples 28 to 49, above. Referring generally to FIGS. 1-3 and particularly to, e.g., FIG. 4, according to method 200, the target fluence is, for each one of scan regions 136, the laser-beam average power divided by a product of the scan width and the traverse scan speed. The target irradiance is, for each one of scan regions 136, the laser-beam average power divided by a product of the laser pulse repetition rate, the laser pulse width, and the laser-beam spot area.

The target fluence and the target irradiance may be calculated according to Eq. 1 and 2. Using the same target fluence and target irradiance for each of scan regions 136 facilitates uniform ablation across area 130.

The following subject matter of this paragraph characterizes example 51 of the present disclosure, wherein example 51 also includes the subject matter according to any one of examples 28 to 50, above. Referring generally to FIGS. 1-3 and particularly to, e.g., FIG. 4, according to method 200, laser beam 120 is configured to ablate area 130 of surface 128 when laser beam 120 is applied along a nominal scan width with the target fluence and the target irradiance. The target fluence is a nominal laser-beam average power divided by a product of the nominal scan width and a nominal traverse scan speed. The target irradiance is the nominal laser-beam average power divided by a product of a nominal laser pulse repetition rate, a nominal laser pulse width, and a nominal laser-beam spot area.

Selection of a nominal scan width, a target fluence, and a target irradiance may provide sufficient information to determine a nominal laser-beam average power, a nominal traverse scan speed, a nominal laser pulse repetition rate, a nominal laser pulse width, and/or a nominal laser-beam spot area. Alternatively, the nominal parameters may define the target fluence and target irradiance. Selection of nominal scan width, target fluence, and/or target irradiance may be useful to tune laser ablation system 100 to ablate different materials (the material to be removed) and/or to preserve different materials (of surface 128) as may be present on various workpieces 124.

The following subject matter of this paragraph characterizes example 52 of the present disclosure, wherein example 52 also includes the subject matter according to any one of examples 28 to 51, above. Referring generally to FIGS. 1-3 and particularly to, e.g., FIG. 4, method 200 further comprises determining a maximum scan width that is a maximum average power of laser beam 120 divided by a product of the target fluence and a maximum traverse scan speed.

Maximum scan width may be determined by target fluence, the maximum average power of laser beam 120 (which also may be referred to as maximum laser-beam average power), and the maximum traverse scan speed. The maximum average power of laser beam 120 may be limited by laser 102 operation limits. The maximum traverse scan speed may be limited by mechanical limits of laser-positioning apparatus 106. The maximum scan width, as determined, may be used to qualify area 130 for the potential for ablation, to divide area 130 into separate subareas with no scan width 140 greater than the maximum scan width, and/or to section area 130 into scan regions 136 that each have scan width 140 that is less than or equal to the maximum scan width.

The following subject matter of this paragraph characterizes example 53 of the present disclosure, wherein example 53 also includes the subject matter according to any one of examples 28 to 52, above. Referring generally to FIGS. 1-3 and particularly to, e.g., FIG. 4, according to method 200, determining the traverse scan speed, the laser-beam average power, the laser pulse repetition rate, the laser pulse width, and the laser-beam spot area is performed at least partially concurrently with scanning area 130 of surface 128.

Determining operation parameters (e.g., traverse scan speed, laser-beam average power, laser pulse repetition rate, laser pulse width, and laser-beam spot area) may be performed during scanning of scan regions 136. Before scanning an individual one of scan regions 136, operation parameters for that individual one of scan regions 136 are determined. Determining operation parameters for one of scan regions 136 is a prerequisite only for scanning that one of scan regions 136. Determining operation parameters may be done for one of scan regions 136 at a time (e.g., just prior to beginning scanning for individual ones of scan regions 136 and/or as individual ones of scan regions 136 are received and/or determined). Determining operation parameters at least partially concurrently with scanning permits dynamic changes of operation parameters and/or scan regions 136 during scanning. Additionally or alternatively, determining operation parameters at least partially concurrently with scanning may overlap the computational overhead time needed to determine operation parameters with the movement of scanning head 104, laser beam 120, and/or workpiece 124 during scanning, hence, increasing operational efficiency.

The following subject matter of this paragraph characterizes example 54 of the present disclosure, wherein example 54 also includes the subject matter according to any one of examples 28 to 53, above. Referring generally to FIGS. 1-3 and particularly to, e.g., FIG. 3, according to method 200, determining the traverse scan speed, the laser-beam average power, the laser pulse repetition rate, the laser pulse width, and the laser-beam spot area comprises determining the traverse scan speed in multiplicative inverse relation to scan width 140 for each one of scan regions 136 when scan width 140 is greater than or equal to a first critical scan width.

For scan regions 136 in which scan width 140 is greater than or equal to the first critical scan width (e.g., $S_1$ in FIG. 3), target fluence may be achieved by selecting a traverse scan speed less than or equal to the maximum traverse scan speed. When scan width 140 is greater than or equal to the first critical scan width, target fluence may be achieved according to Eq. 2. The traverse scan speed may compensate for changes in scan width 140 in inverse proportion. Compensating changes in scan width 140 by inverse changes in traverse scan speed permits maintaining the target fluence without changing operation parameters of laser 102.

The following subject matter of this paragraph characterizes example 55 of the present disclosure, wherein example 55 also includes the subject matter according to any one of examples 28 to 54, above. Referring generally to FIGS. 1-3 and particularly to, e.g., FIG. 3, according to method 200, determining the traverse scan speed, the laser-beam average power, the laser pulse repetition rate, the laser pulse width, and the laser-beam spot area comprises equating the traverse scan speed to a maximum traverse scan speed and determining the laser pulse repetition rate in proportion to scan width 140 for each one of scan regions 136 when scan width 140 is less than a first critical scan width and greater than or equal to a second critical scan width. The first critical scan width is greater than the second critical scan width.

For scan regions 136 in which scan width 140 is less than the first critical scan width (e.g., $S_1$ in FIG. 3), target fluence may be achieved by selecting a traverse scan speed greater than the maximum traverse scan speed. Smaller scan width 140 requires larger traverse scan speed to produce the same target fluence. If scan width 140 is small enough (i.e., less than the first critical scan width) to imply a traverse scan speed greater than the maximum traverse scan speed, traverse scan speed may be set to the maximum traverse scan speed and the laser-beam average power reduced to achieve the target fluence based on the maximum traverse scan speed and scan width 140 that is less than the first critical scan width. The laser-beam average power may be reduced in proportion to the scan width 140 (according to Eq. 2) to achieve the target fluence. Laser-beam average power may be reduced in proportion to laser pulse repetition rate while maintaining the target irradiance (according to Eq. 1). Hence, to achieve both the target fluence and the target irradiance, the laser pulse repetition rate may be reduced in proportion to scan width 140 while the traverse scan speed is at the maximum traverse scan speed. Scan regions 136 may have a second critical scan width (e.g., $S_2$ in FIG. 3) below which this algorithm is not practical, desired, or reliable.

The following subject matter of this paragraph characterizes example 56 of the present disclosure, wherein example 56 also includes the subject matter according to any one of examples 28 to 55, above. Referring generally to FIGS. 1-3 and particularly to, e.g., FIG. 3, according to method 200, determining the traverse scan speed, the laser-beam average power, the laser pulse repetition rate, the laser pulse width, and the laser-beam spot area comprises equating the traverse scan speed to a maximum traverse scan speed, equating the laser pulse repetition rate to a minimum laser pulse repetition rate, and determining the laser pulse width in proportion to scan width 140 for each one of scan regions 136 when scan width 140 is less than a second critical scan width and greater than or equal to a third critical scan width. The second critical scan width is greater than the third critical scan width.

For scan regions 136 in which scan width 140 is less than the second critical scan width (e.g., $S_2$ in FIG. 3), target fluence may be achieved by selecting a traverse scan speed greater than the maximum traverse scan speed and/or by selecting a traverse scan speed at the maximum traverse scan speed and selecting a laser pulse repetition rate less than the minimum laser pulse repetition rate. Smaller scan width 140 requires larger traverse scan speed to produce the same target fluence and smaller laser pulse repetition to achieve the same target fluence and target irradiance. If scan width 140 is small enough (i.e., less than the second critical scan width) to imply a traverse scan speed at the maximum traverse scan speed and a laser pulse repetition rate less than the minimum laser pulse repetition rate, traverse scan speed may be set to the maximum traverse scan speed, laser pulse repetition rate may be set to the minimum laser pulse repetition rate, and the laser-beam average power reduced to achieve the target fluence based on the maximum traverse scan speed and scan width 140 that is less than the second critical scan width. The laser-beam average power may be reduced in proportion to scan width 140 (according to Eq. 2) to achieve the target fluence. Laser-beam average power may be reduced in proportion to laser pulse width while maintaining the target irradiance (according to Eq. 1). Hence, to achieve both the target fluence and the target irradiance, the laser pulse width may be reduced in proportion to scan width 140 while the traverse scan speed is at the maximum traverse scan speed and the laser pulse repetition rate is at the minimum laser pulse repetition rate. Scan regions 136 may have a third critical scan width (e.g., $S_3$ in FIG. 3) below which this algorithm is not practical, desired, or reliable.

The following subject matter of this paragraph characterizes example 57 of the present disclosure, wherein example 57 also includes the subject matter according to any one of examples 28 to 56, above. Referring generally to FIGS. 1-3 and particularly to, e.g., FIG. 3, according to method 200, determining the traverse scan speed, the laser-beam average power, the laser pulse repetition rate, the laser pulse width, and the laser-beam spot area comprises equating the traverse scan speed to a maximum traverse scan speed, equating the laser pulse repetition rate to a minimum laser pulse repetition rate, equating the laser pulse width to a minimum laser pulse width, and determining the laser-beam spot area in proportion to scan width 140 for each one of scan regions 136 when scan width 140 is less than a third critical scan width.

For scan regions 136 in which scan width 140 is less than the third critical scan width (e.g., $S_3$ in FIG. 3), target fluence may be achieved by selecting a traverse scan speed greater than the maximum traverse scan speed, by selecting a traverse scan speed at the maximum traverse scan speed and selecting a laser pulse repetition rate less than the minimum laser pulse repetition rate, and/or by selecting a traverse scan speed at the maximum traverse scan speed, selecting a laser pulse repetition rate at the minimum laser pulse repetition rate, and selecting a laser pulse width less than the minimum laser pulse width. Smaller scan width 140 requires larger traverse scan speed to produce the same target fluence, smaller laser pulse repetition to achieve the same target fluence and target irradiance, and smaller laser pulse width to achieve the same target fluence and target irradiance. If scan width 140 is small enough (i.e., less than the third critical scan width) to imply a traverse scan speed at the maximum traverse scan speed, a laser pulse repetition rate at the minimum laser pulse repetition rate, and a laser pulse width less than the minimum laser pulse width, traverse scan speed may be set to the maximum traverse scan speed, laser pulse repetition rate may be set to the minimum laser pulse repetition rate, laser pulse width may be set to the minimum laser pulse width, and the laser-beam average power reduced to achieve the target fluence based on the maximum traverse scan speed and scan width 140 that is less than the third critical scan width. The laser-beam average power may be reduced in proportion to scan width 140 (according to Eq. 2) to achieve the target fluence. Laser-beam average power may be reduced in proportion to laser-beam spot area while maintaining the target irradiance (according to Eq. 1). Hence, to achieve both the target fluence and the target irradiance, the laser-beam spot area may be reduced in proportion to scan width 140 while the traverse scan speed is at the maximum traverse scan speed, the laser pulse repetition rate is at the minimum laser pulse repetition rate, and the laser pulse width is at the minimum laser pulse width. Scan regions 136 may have a fourth critical scan width (e.g., $S_4$ in FIG. 3) below which this algorithm is not practical, desired, or reliable.

The following subject matter of this paragraph characterizes example 58 of the present disclosure, wherein example 58 also includes the subject matter according to any one of examples 28 to 57, above. Referring generally to FIGS. 1-3 and particularly to, e.g., FIG. 4, according to method 200, scanning area 130 of surface 128 comprises scanning laser beam 120 at a raster scan speed across scan width 140 of each one of scan regions 136.

Laser beam 120 is scanned a distance of scan width 140 across each one of scan regions 136 and along scan width direction 144. Each one of scan regions 136 may have a different scan width 140. Laser beam 120 is scanned at a rate of the raster scan speed. The raster scan speed is fast relative to the traverse scan speed (rate of change between scan regions 136 and/or along the traverse direction 146). Generally, the raster scan speed is much faster than the traverse scan speed such that laser beam 120 as it is scanned at raster scan speed may be treated as a laser sheet. For example, the raster scan speed may be greater than 1,000 times the traverse scan speed. Scanning may include optically scanning laser beam 120 because optically scanning laser beam 120 is generally much faster than mechanically scanning laser beam 120.

The following subject matter of this paragraph characterizes example 59 of the present disclosure, wherein example 59 also includes the subject matter according to example 58, above. Referring generally to FIGS. 1-3 and particularly to, e.g., FIG. 4, method 200 further comprises determining the raster scan speed to completely ablate each one of scan regions 136 while scanning area 130 of surface 128.

The raster scan speed may be determined according to the amount and/or type of material to be ablated, the optical absorbance of the material to be ablated, and the laser wavelength. Slower raster scan speeds may deposit more energy into a small region of surface 128 (i.e., a region the size of the laser-beam spot area) in a shorter time than faster raster scan speeds. Faster raster scan speeds may be beneficial to reduce thermal effects on the underlying material of surface 128 as laser beam 120 ablates the overlying material. Faster raster scan speeds may permit vapor and/or particulates (e.g., smoke) to dissipate sufficiently to reduce optical interference with laser beam 120 (relative to slower raster scan speeds). Generally, the raster scan speed is sufficiently fast to treat the scanned laser beam 120 as a laser sheet.

The following subject matter of this paragraph characterizes example 60 of the present disclosure, wherein example 60 also includes the subject matter according to any one of examples 58 to 59, above. Referring generally to FIGS. 1-3 and particularly to, e.g., FIG. 4, method 200 further comprises determining the raster scan speed to be greater than a product of scan width 140 and the traverse scan speed divided by an effective average diameter of the laser-beam spot area for each one of scan regions 136.

The raster scan speed may be great enough that the entirety of each one of scan regions 136 is scanned by laser beam 120 before laser beam 120 is moved at traverse scan speed in traverse direction 146 the distance of an effective average diameter of the laser-beam spot area. Scanning at such a raster scan speed provides for uniform coverage of scan regions 136 and area 130. The effective average diameter of laser-beam spot area is the diameter of a circle having the same area as the laser-beam spot area. The laser-beam spot area may or may not have a circular profile.

The following subject matter of this paragraph characterizes example 61 of the present disclosure, wherein example 61 also includes the subject matter according to any one of examples 58 to 60, above. Referring generally to FIGS. 1-3 and particularly to, e.g., FIG. 4, according to method 200, the raster scan speed for scan regions 136 is greater than a product of a maximum scan width and a maximum traverse scan speed divided by an effective average diameter of a minimum laser-beam spot area.

The raster scan speed may be set to accommodate the maximum scan width and the maximum traverse scan speed that may be achieved for a given apparatus (such as laser ablation system 100). Such a raster scan speed may be used for each of scan regions 136. Hence, the raster scan speed does not need to be changed between scan regions 136 to maintain the target fluence or target irradiance.

The following subject matter of this paragraph characterizes example 62 of the present disclosure, wherein example 62 also includes the subject matter according to any one of examples 28 to 61, above. Referring generally to FIGS. 1-3 and particularly to, e.g., FIG. 4, according to method 200, scan regions 136 of area 130 of surface 128 are contiguous so that area 130 is continuous.

Scan regions 136 are contiguous with each other, i.e., neighboring scan regions 136 touch, partially overlap, and/or connect with each other. With contiguous scan regions 136, laser beam 120 may be scanned from one of scan regions 136 to the next of scan regions 136 in a continuous motion, without needing to translate surface 128 relative to scanning head 104 between scan regions 136. Hence, scanning contiguous scan regions 136 does not need to incur delay between scan regions 136 and consequent inefficiency of ablation of area 130. Contiguous scan regions 136 provide for area 130 that is continuous and that may be characterized by having a single boundary to encompass all of scan regions 136. Area 130 that is continuous may have no internal voids or vacancies (regions not included in one of scan regions 136).

The following subject matter of this paragraph characterizes example 63 of the present disclosure, wherein example 63 also includes the subject matter according to any one of examples 28 to 62, above. Referring generally to FIGS. 1-3 and particularly to, e.g., FIG. 4, according to method 200, area 130 of surface 128 consists of scan regions 136.

Area 130 may comprise scan regions 136, may consist essentially of scan regions 136, and may comprise only scan regions 136. Scan regions 136 may be derived by sectioning area 130 such that each of scan regions 136 is a portion of area 130.

The following subject matter of this paragraph characterizes example 64 of the present disclosure, wherein example 64 also includes the subject matter according to any one of examples 28 to 63, above. Referring generally to FIGS. 1-3 and particularly to, e.g., FIG. 4, sequentially scanning, across scan width 140, each one of scan regions 136 of area 130 with laser beam 120 at the target fluence and the target irradiance, comprises scanning laser beam 120 across area 130 of surface 128 with scan spacing 148 separating scanning head 104 from area 130 of surface 128.

Scan spacing 148 between scanning head 104 and area 130 of surface 128 may provide clearance and/or avoid contact between scanning head 104 and surface 128. Scan spacing 148 may be at focal point of laser beam 120 (if laser beam 120 has a focal point outside of scanning head 104) and/or may function to establish the laser-beam spot area as laser beam 120 is scanned across area 130.

The following subject matter of this paragraph characterizes example 65 of the present disclosure, wherein example 65 also includes the subject matter according to example 64, above. Referring generally to FIGS. 1-3 and particularly to, e.g., FIG. 4, according to method 200, scan spacing 148, separating scanning head 104 from area 130 of surface 128, is substantially constant within each one of scan regions 136.

Substantially constant (or uniform) scan spacing 148 within one of scan regions 136 may establish a substantially constant (or uniform) laser-beam spot area in that one of scan regions 136. For each one of scan regions 136, scan spacing 148 may be substantially constant (or uniform), though different ones of scan regions 136 may be scanned with different scan spacing 148 values. Scan spacing 148 (and hence possibly the laser-beam spot area) may be optimized for each one of scan regions 136 independently.

The following subject matter of this paragraph characterizes example 66 of the present disclosure, wherein example 66 also includes the subject matter according to any one of examples 64 to 65, above. Referring generally to FIGS. 1-3 and particularly to, e.g., FIG. 4, according to method 200, scan spacing 148, separating scanning head 104 from area 130 of surface 128, is substantially constant for all scan regions 136.

Scan spacing 148 may not vary between scan regions 136, which may facilitate transitions between scan regions 136 without translation of surface 128 relative to scanning head 104. Substantially constant (or uniform) scan spacing 148 for all scan regions 136 may not preclude adjustment of laser-beam spot area. The laser-beam spot area may be varied as necessary or desired by adjusting the focal distance of laser beam 120 from scanning head 104.

The following subject matter of this paragraph characterizes example 67 of the present disclosure, wherein example 67 also includes the subject matter according to any one of examples 28 to 66, above. Referring generally to FIGS. 1-3 and particularly to, e.g., FIG. 4, according to method 200, sequentially scanning, across scan width 140, each one of scan regions 136 of area 130 with laser beam 120 at the target fluence and the target irradiance, comprises scanning laser beam 120 across area 130 of surface 128 with an angle of incidence substantially normal to each one of scan regions 136.

Scanning each of scan regions 136 at a perpendicular (normal) angle of incidence may provide for effective ablation in scan regions 136. Laser beam 120 may have higher (or maximum) target irradiance when laser beam 120 is oriented normal to surface 128. If laser beam 120 impinges surface 128 at an angle significantly different from normal (perpendicular), the spot of laser beam 120 may distort and become larger (thus reducing target irradiance). As used herein, a normal angle of incidence is approximately perpendicular to surface 128 (at about 90°, e.g., within the range of 80°-90°).

Examples of the present disclosure may be described in the context of aircraft manufacturing and service method 1100 as shown in FIG. 5 and aircraft 1102 as shown in FIG. 6. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 6, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of using a laser ablation system to clean an area of a surface with a laser beam, having a target fluence and a target irradiance, the area comprising scan regions, each having a scan width, the method comprising:
   using a controller of the laser ablation system to determine, based on one or more characteristics of the area of the surface, a traverse scan speed, a laser-beam average power, a laser pulse repetition rate, a laser pulse width, and a laser-beam spot area of the laser beam for each one of the scan regions to achieve the target fluence and the target irradiance of the laser beam when scanning each one of the scan regions with the laser beam, wherein a first scan width of at least one of the scan regions is different from a second scan width of another one of the scan regions; and
   using the controller to cause a scanning head of the laser ablation system to sequentially scan each one of the scan regions of the area with the laser beam at the target fluence and the target irradiance, and wherein the controller causes the scanning head to:
   scan the at least one of the scan regions with the first scan width, wherein the scanning head achieves the target fluence and the target irradiance when scanning the at least one of the scan regions; and
   subsequently scan a different one of the scan regions with the second scan width, wherein the controller causes an adjustment in at least one of the traverse scan speed, the laser-beam average power, the laser pulse repetition rate, the laser pulse width, and the laser-beam spot area so that the scanning head achieves the target fluence and the target irradiance when scanning the different one of the scan regions.

2. The method according to claim 1, wherein:
   the laser beam has an initial laser-beam average power,
   the scan regions comprise an adapted scan region,
   determining the traverse scan speed, the laser-beam average power, the laser pulse repetition rate, the laser pulse width, and the laser-beam spot area for each one of the scan regions comprises determining that a projected traverse scan speed for the adapted scan region is greater than a maximum traverse scan speed,
   the projected traverse scan speed for the adapted scan region is the initial laser-beam average power divided by a product of the scan width of the adapted scan region and the target fluence, and
   the method further comprises determining an adapted laser-beam average power that is a product of the target fluence, the scan width of the adapted scan region, and the maximum traverse scan speed.

3. The method according to claim 2, wherein:
   the laser pulse repetition rate of the adapted scan region is the adapted laser-beam average power divided by a product of the target irradiance, the laser pulse width for the adapted scan region, and the laser-beam spot area for the adapted scan region; and
   scanning the area of the surface comprises scanning the adapted scan region at the maximum traverse scan speed across the scan width of the adapted scan region while the laser beam has the adapted laser-beam average power, the laser pulse repetition rate for the adapted scan region, the laser pulse width for the adapted scan region, and the laser-beam spot area for the adapted scan region.

4. The method according to claim 2, wherein:
   determining the traverse scan speed, the laser-beam average power, the laser pulse repetition rate, the laser pulse width, and the laser-beam spot area for each one of the scan regions comprises determining that a projected laser pulse repetition rate for the adapted scan region is less than a minimum laser pulse repetition rate, and
   the projected laser pulse repetition rate for the adapted scan region is the adapted laser-beam average power divided by a product of the target irradiance, the laser pulse width for the adapted scan region, and the laser-beam spot area for the adapted scan region.

5. The method according to claim 4, wherein:
   the laser pulse width for the adapted scan region is the adapted laser-beam average power divided by a product of the target irradiance, the minimum laser pulse repetition rate, and the laser-beam spot area for the adapted scan region; and
   scanning the area of the surface comprises scanning the adapted scan region at the maximum traverse scan speed across the scan width of the adapted scan region while the laser beam has the adapted laser-beam average power, the minimum laser pulse repetition rate, the laser pulse width for the adapted scan region, and the laser-beam spot area for the adapted scan region.

6. The method according to claim 4, wherein:
   determining the traverse scan speed, the laser-beam average power, the laser pulse repetition rate, the laser pulse width, and the laser-beam spot area for each one of the scan regions comprises determining that a projected laser pulse width for the adapted scan region is less than a minimum laser pulse width;
   the projected laser pulse width for the adapted scan region is the adapted laser-beam average power divided by a product of the target irradiance, the minimum laser pulse repetition rate, and the laser-beam spot area for the adapted scan region;
   the laser-beam spot area for the adapted scan region is the adapted laser-beam average power divided by a product of the target irradiance, the minimum laser pulse repetition rate, and the minimum laser pulse width; and
   scanning the area of the surface comprises scanning the adapted scan region at the maximum traverse scan speed across the scan width of the adapted scan region while the laser beam has the adapted laser-beam average power, the minimum laser pulse repetition rate, the minimum laser pulse width, and the laser-beam spot area for the adapted scan region.

7. The method according to claim 1, wherein determining the traverse scan speed, the laser-beam average power, the laser pulse repetition rate, the laser pulse width, and the laser-beam spot area is performed at least partially concurrently with scanning the area of the surface.

8. The method according to claim 1, wherein determining the traverse scan speed, the laser-beam average power, the laser pulse repetition rate, the laser pulse width, and the laser-beam spot area comprises determining the traverse scan speed in multiplicative inverse relation to the scan width for each one of the scan regions when the scan width is greater than or equal to a first critical scan width.

9. The method according to claim 1, wherein:
determining the traverse scan speed, the laser-beam average power, the laser pulse repetition rate, the laser pulse width, and the laser-beam spot area comprises equating the traverse scan speed to a maximum traverse scan speed and determining the laser pulse repetition rate in proportion to the scan width for each one of the scan regions when the scan width is less than a first critical scan width and greater than or equal to a second critical scan width; and
the first critical scan width is greater than the second critical scan width.

10. The method according to claim 1, wherein:
determining the traverse scan speed, the laser-beam average power, the laser pulse repetition rate, the laser pulse width, and the laser-beam spot area comprises equating the traverse scan speed to a maximum traverse scan speed, equating the laser pulse repetition rate to a minimum laser pulse repetition rate, and determining the laser pulse width in proportion to the scan width for each one of the scan regions when the scan width is less than a first critical scan width and greater than or equal to a second critical scan width; and
the first critical scan width is greater than the second critical scan width.

11. The method according to claim 1, wherein determining the traverse scan speed, the laser-beam average power, the laser pulse repetition rate, the laser pulse width, and the laser-beam spot area comprises equating the traverse scan speed to a maximum traverse scan speed, equating the laser pulse repetition rate to a minimum laser pulse repetition rate, equating the laser pulse width to a minimum laser pulse width, and determining the laser-beam spot area in proportion to the scan width for each one of the scan regions when the scan width is less than a critical scan width.

12. The method according to claim 1, wherein sequentially scanning, across the scan width, each one of the scan regions of the area with the laser beam at the target fluence and the target irradiance, comprises scanning the laser beam across the area of the surface with a scan spacing separating the scanning head from the area of the surface.

13. The method according to claim 1, wherein:
the laser beam has an initial laser-beam average power, and
for at least one of the scan regions, the traverse scan speed is the initial laser-beam average power divided by a product of the scan width of at least the one of the scan regions and the target fluence.

14. The method according to claim 1, wherein:
the target fluence is, for each one of the scan regions, the laser-beam average power divided by a product of the scan width and the traverse scan speed, and
the target irradiance is, for each one of the scan regions, the laser-beam average power divided by a product of the laser pulse repetition rate, the laser pulse width, and the laser-beam spot area.

15. The method according to claim 1, wherein:
the laser beam is configured to ablate the area of the surface when the laser beam is applied along a nominal scan width with the target fluence and the target irradiance,
the target fluence is a nominal laser-beam average power divided by a product of the nominal scan width and a nominal traverse scan speed, and
the target irradiance is the nominal laser-beam average power divided by a product of a nominal laser pulse repetition rate, a nominal laser pulse width, and a nominal laser-beam spot area.

16. The method according to claim 1, further comprising determining a maximum scan width that is a maximum average power of the laser beam divided by a product of the target fluence and a maximum traverse scan speed.

17. The method according to claim 1, wherein:
scanning the area of the surface comprises scanning the laser beam at a raster scan speed across the scan width of each one of the scan regions; and
the method further comprises determining the raster scan speed to be greater than a product of the scan width and the traverse scan speed divided by an effective average diameter of the laser-beam spot area for each one of the scan regions.

18. The method according to claim 1, wherein:
scanning the area of the surface comprises scanning the laser beam at a raster scan speed across the scan width of each one of the scan regions; and
the raster scan speed for the scan regions is greater than a product of a maximum scan width and a maximum traverse scan speed divided by an effective average diameter of a minimum laser-beam spot area.

19. The method according to claim 1, wherein sequentially scanning, across the scan width, each one of the scan regions of the area with the laser beam at the target fluence and the target irradiance, comprises scanning the laser beam across the area of the surface with an angle of incidence substantially normal to each one of the scan regions.

* * * * *